United States Patent
Aoai et al.

(10) Patent No.: US 12,294,782 B2
(45) Date of Patent: May 6, 2025

(54) INFORMATION PROCESSING APPARATUS AND INFORMATION PROCESSING METHOD

(71) Applicant: SONY GROUP CORPORATION, Tokyo (JP)

(72) Inventors: Shosuke Aoai, Tokyo (JP); Kohta Horiuchi, Tokyo (JP); Tasuku Inui, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 204 days.

(21) Appl. No.: 17/906,247

(22) PCT Filed: Mar. 23, 2021

(86) PCT No.: PCT/JP2021/012072
§ 371 (c)(1),
(2) Date: Sep. 13, 2022

(87) PCT Pub. No.: WO2021/200410
PCT Pub. Date: Oct. 7, 2021

(65) Prior Publication Data
US 2023/0136388 A1    May 4, 2023

(30) Foreign Application Priority Data
Mar. 31, 2020    (JP) .................. 2020-063151

(51) Int. Cl.
*H04N 23/661* (2023.01)
*H04N 5/268* (2006.01)
(Continued)

(52) U.S. Cl.
CPC .......... *H04N 23/661* (2023.01); *H04N 5/268* (2013.01); *H04N 23/695* (2023.01); *H04W 48/18* (2013.01)

(58) Field of Classification Search
CPC .... H04N 23/661; H04N 5/268; H04N 23/695; H04N 23/69; H04W 48/18
See application file for complete search history.

(56) References Cited

U.S. PATENT DOCUMENTS

| | | | | |
|---|---|---|---|---|
| 2009/0135307 A1* | 5/2009 | Kurita | .................. | H04L 69/14 348/729 |
| 2015/0350522 A1* | 12/2015 | Lindskog | ............... | H04N 23/67 348/349 |

(Continued)

FOREIGN PATENT DOCUMENTS

| | | |
|---|---|---|
| JP | 09-322051 A | 12/1997 |
| JP | 10-313454 A | 11/1998 |

(Continued)

OTHER PUBLICATIONS

International Search Report and Written Opinion of PCT Application No. PCT/JP2021/012072, issued on Jun. 22, 2021, 09 pages of ISRWO.

(Continued)

*Primary Examiner* — Mekonnen D Dagnew
(74) *Attorney, Agent, or Firm* — CHIP LAW GROUP

(57) ABSTRACT

An information processing apparatus includes: a determination unit that determines a type or an intended use of transmission information transmitted from an imaging device to a predetermined device that performs processing related to imaging control of the imaging device; and an association unit that associates, with the transmission information, information regarding a network slice in which the transmission information is to be used for transmission among a plurality of network slices on the basis of the determined type or intended use.

17 Claims, 10 Drawing Sheets

(51) Int. Cl.
*H04N 23/695* (2023.01)
*H04W 48/18* (2009.01)

(56) References Cited

U.S. PATENT DOCUMENTS

| | | |
|---|---|---|
| 2016/0014320 A1 | 1/2016 | Feltham |
| 2018/0109737 A1 | 4/2018 | Nakamura |
| 2019/0124561 A1* | 4/2019 | Faccin ................. H04W 16/04 |
| 2019/0174107 A1* | 6/2019 | Miyake ................. H04N 23/88 |
| 2020/0007756 A1* | 1/2020 | Tsuchiya ................ H04N 23/72 |

FOREIGN PATENT DOCUMENTS

| | | |
|---|---|---|
| JP | 2011-101165 A | 5/2011 |
| WO | 2018/181249 A1 | 10/2018 |
| WO | 2019/073802 A1 | 4/2019 |

OTHER PUBLICATIONS

Choyi Vinod Kumar et al: "Network Slice Selection, Assignment and Routing within 5G Networks", 2016 IEEE Conference On Standards for Communications and Networking (CSCN), IEEE, Oct. 31, 2016 (Oct. 31, 2016), pp. 1-7, XP033026803, DOI: 10.1109/CSCN.2016.7784887 [retrieved on Dec. 15, 2016] *the whole document *.

* cited by examiner

FIG. 9

| No | SLICE | | TYPE OF TRANSMISSION INFORMATION | | INTENDED USE OF TRANSMISSION INFORMATION | | ACQUISITION METHOD | ACQUISITION SOURCE |
|---|---|---|---|---|---|---|---|---|
| 1 | LOW LATENCY | LOW LATENCY A | SUBJECT-RELATED INFORMATION | UNIFORM NUMBER/NAME INFORMATION | AUTOMATIC CONTROL | SUBJECT CURRENT POSITION | IMAGE ANALYSIS (CHARACTER RECOGNITION) | CAMERA |
| 2 | | | | DEPTH | | | IMAGE ANALYSIS/SENSOR OUTPUT | CAMERA/SENSOR (LIDAR) |
| 3 | | | | COLOR/LUMINANCE INFORMATION | | | SENSOR OUTPUT (IMAGE SENSOR) | CAMERA |
| 4 | | | | LUMINANCE CHANGE (DVS) | | | SENSOR OUTPUT (IMAGE SENSOR) | CAMERA |
| 5 | | LOW LATENCY B | | GPS | | | WEARABLE SENSOR | WEARABLE SENSOR |
| 6 | | | | POSTURE ESTIMATION/BONE ESTIMATION | | SUBJECT FUTURE POSITION | IMAGE ANALYSIS (AI) | CAMERA |
| 7 | | (LOW LATENCY C) | | ACCELERATION | | SCENE ESTIMATION | WEARABLE SENSOR | WEARABLE SENSOR |
| 8 | | | IMAGING INFORMATION | CAMERA POSITION ANGLE OF VIEW INFORMATION | | CAMERA IMAGING RANGE | SENSOR OUTPUT (GPS, AZIMUTH SENSOR/METADATA) | CAMERA/CAMERA PLATFORM |
| 9 | BEST EFFORT | BEST EFFORT A | IMAGE INFORMATION | ON-AIR VIDEO NEXT VIDEO | VIDEO DISTRIBUTION | FOR BROADCASTING/DISTRIBUTION | SENSOR OUTPUT (IMAGE SENSOR) | CAMERA |
| 10 | | BEST EFFORT B | | OTHER VIDEO | VIDEO PRODUCTION | FOR STATUS CONFIRMATION/POST-PROCESS | SENSOR OUTPUT (IMAGE SENSOR) | CAMERA |

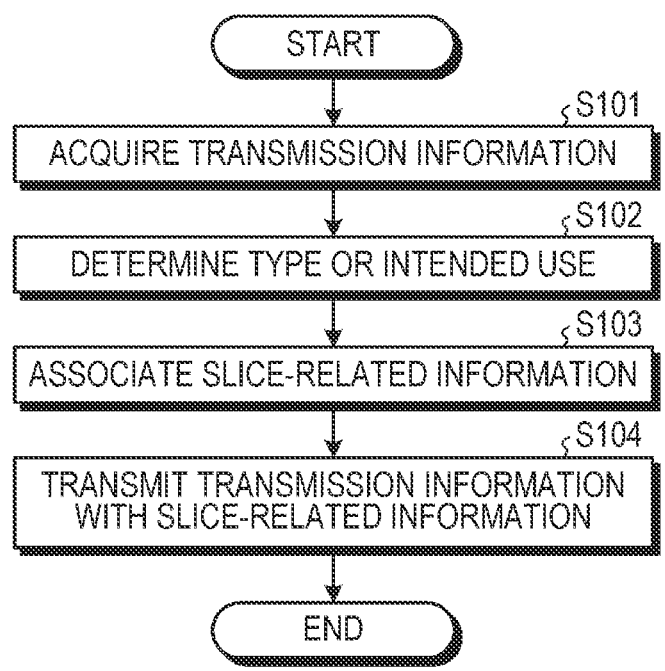

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/012072 filed on Mar. 23, 2021, which claims priority benefit of Japanese Patent Application No. JP 2020-063151 filed in the Japan Patent Office on Mar. 31, 2020. Each of the above-referenced applications is hereby incorporated herein by reference in its entirety.

TECHNICAL FIELD

The present disclosure relates to an information processing apparatus and an information processing method.

BACKGROUND ART

Network distribution of contents has been facilitated, and the number of pieces of content is growing. In recent years, there is an increasing demand for labor saving in imaging so that more video content can be provided to users. The labor saving in imaging may be exemplified by imaging control of a camera by an imaging control device (for example, a server device connected to the camera via a network).

CITATION LIST

Patent Document

Patent Document 1: Japanese Patent Application Laid-Open No. H9-322051
Patent Document 2: Japanese Patent Application Laid-Open No. 2011-101165

SUMMARY OF THE INVENTION

Problems to be Solved by the Invention

The imaging control of the camera is carried out via a network. Data transmission using a network involves considerable latency. In particular, wireless communication is likely to be unstable, and high latency may occur when there is a wireless connection between the imaging control device and the camera. Latency may be an obstacle to timely imaging. In a case where imaging control is carried out via a network, high-quality imaging control may not be possible.

The present disclosure thus proposes an information processing apparatus and an information processing method enabling achievement of high-quality imaging control.

Solutions to Problems

In order to solve the problems described above, an information processing apparatus according to an aspect of the present disclosure includes: a determination unit that determines a type or an intended use of transmission information transmitted from an imaging device to a predetermined device that performs processing related to imaging control of the imaging device; and an association unit that associates, with the transmission information, information regarding a network slice in which the transmission information is to be used for transmission among a plurality of network slices on the basis of the determined type or intended use.

BRIEF DESCRIPTION OF DRAWINGS

FIG. 9 is a diagram illustrating a relationship between a type/intended use of transmission information and a slice to be used for transmission.
FIG. 10 is a flowchart showing a transmission control process according to the present embodiment.

MODE FOR CARRYING OUT THE INVENTION

Figure 1:
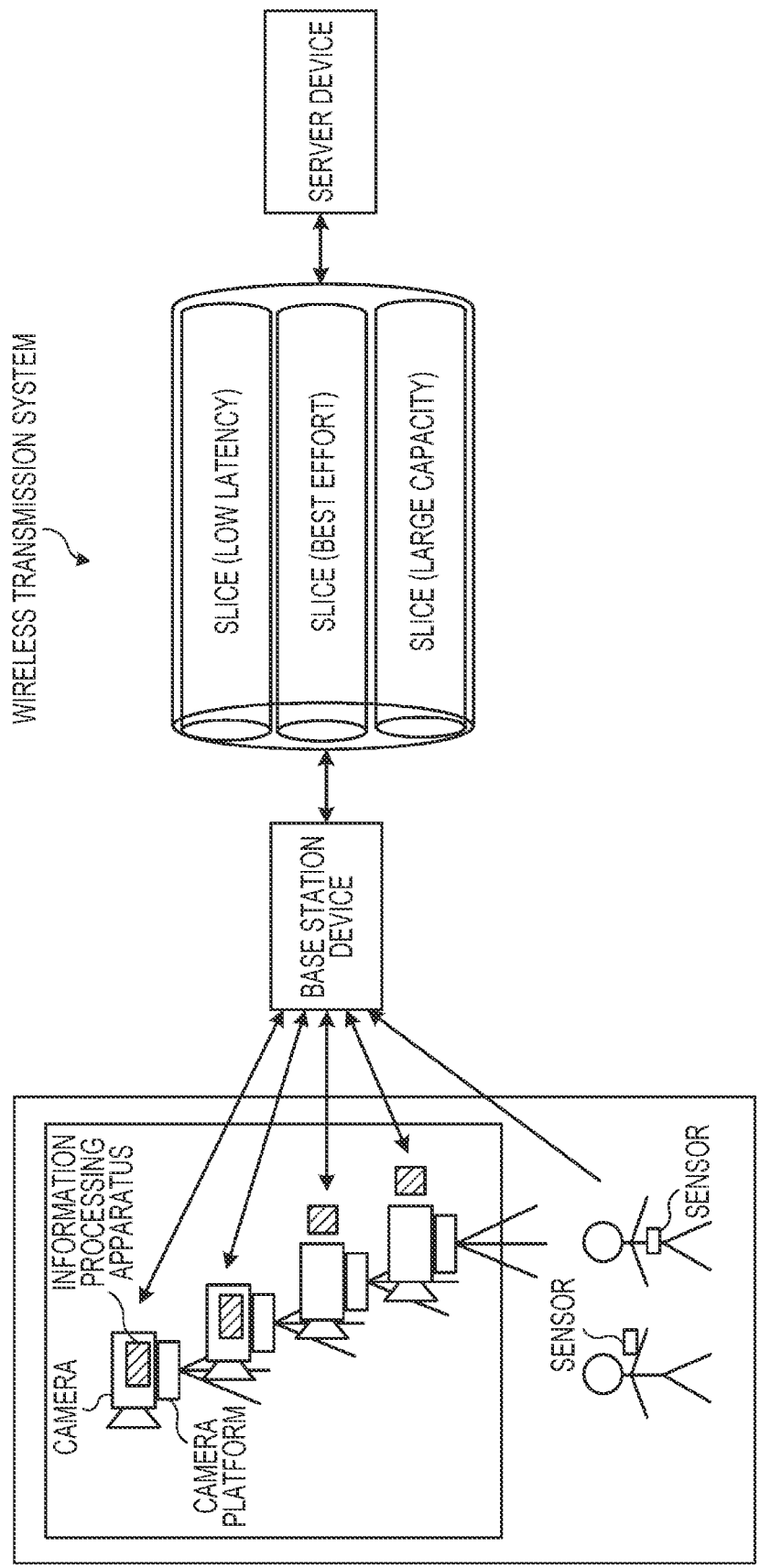
FIG. 1 is a diagram illustrating a wireless transmission system as an example of an information processing system according to the present embodiment.

Hereinafter, embodiments of the present disclosure are described in detail on the basis of the drawings. Note that, in each of the following embodiments, the same components are denoted by the same reference numerals, and redundant description is omitted.

In addition, in the present specification and the drawings, there may be a case where a plurality of constituent elements having substantially the same functional configuration is distinguished by attaching different numerals after the same reference symbols. For example, a plurality of configurations having substantially the same functional configuration is distinguished as imaging devices $40_1$ and $40_2$ as necessary. However, in a case where it is not particularly necessary to distinguish each of a plurality of constituent elements having substantially the same functional configuration, only the same reference symbol is provided. For example, in a case where it is not necessary to particularly distinguish the imaging devices $40_1$ and $40_2$, they are simply referred to as the imaging device 40.

Furthermore, the present disclosure is described according to the following order of the sections.
1. Introduction
   1-1. Overview of present embodiment 2. Configuration of information processing system
   2-1. Configuration of server device
   2-2. Configuration of management device
   2-3. Configuration of base station device
   2-4. Configuration of imaging device 2-5. Configuration of camera platform
2-6. Configuration of information processing apparatus
3. Operation of information processing system
3-1. Overview of process
3-2. Relationship between type/intended use of transmission information and slice
3-3. Transmission control process
3-4. Example of control by server device
3-5. Another example of transmission control process
4. Modification
5. Conclusion

1. INTRODUCTION

In recent years, contents distribution using a network such as over the top (OTT) has become common. Accordingly, the number of pieces of content produced is steadily growing. In order to cope with an increase in the number of pieces of content produced, labor saving in imaging is strongly demanded. Under such circumstances, in recent years, so-called automatic imaging is being contemplated, in which a camera is controlled by a computer (hereinafter referred to as a server device) on the basis of image data or analysis information of the image data (for example, information of the image data analyzed by using AI).

In order to carry out automatic imaging, the server device needs to control cameras on the basis of information regarding a plurality of cameras related to the produced content (for example, information indicating an imaging range and image information).

As a method for controlling the cameras, a method is conceived in which each camera is connected to a server device in a wired or wireless manner, and the server device transmits a control signal to each camera on the basis of each piece of camera information. For example, a method is conceived in which the server device controls an imaging camera so that the subject falls under a specific composition position on the basis of positional information of the subject acquired from a bird's eye view camera.

Note that, in a case where the server device images the same scene from a plurality of angles using a plurality of cameras, the following methods (1) to (3) are also conceived.

(1) The server device controls the composition on the basis of information that a certain camera is tracking and imaging a first subject, such that another camera images a second subject different from the first subject, so that the subject is different for each camera.
(2) On the basis of viewpoint position information of a certain camera, the server device controls composition of another camera so as to perform imaging control on a certain subject from different angles.
(3) The server device controls an angle of view on the basis of scene information acquired from an imaging angle of view of a certain camera so as to image a subject corresponding to the scene. For example, in a case of a ball game, when a scene of a shot by a subject is detected by a certain camera, the server device controls the composition such that a goal falls under an imaging angle of view of another camera.

It is also conceivable that a person performs the above-described control instead of the server device. For a large-scale event (content) such as a major sport, a large-scale tournament, or a large-scale league, it is possible to secure a large amount of cost. Therefore, in the distribution of these types of content, it is possible to secure a large number of personnel for content production (for example, imaging or editing). However, in a relatively small-scale event (content) such as a minor sport, a college league, a minor league or an independent league, it is not possible to secure sufficient cost and personnel for content production. Therefore, it is desirable that the server device carry out a series of processes (for example, generation of an analysis/control signal).

However, in a case where the server device carries out the series of processes, these processes are processes via a network. Therefore, data transmission between the server device and the camera involves considerable latency. In this case, when the camera actually operates on the basis of the control of the server device, the timing is different from the originally intended timing. As a result, it is difficult to acquire a captured image of quality desired by the user. In particular, in imaging in the sports field where the situation changes on a moment-to-moment basis, the latency has an extremely large impact on the quality of the captured image.

In this respect, the present embodiment enables achievement of high-quality imaging control.

1-1. Overview of Present Embodiment

Hereinafter, prior to detailed description of the information processing system of the present embodiment, an outline of the present embodiment is be described.

In recent years, radio access technology (RAT) such as long-term evolution (LTE) and new radio (NR) has rapidly advanced, and data having a large amount of information can now be transmitted in a wireless manner. Also in sports production in which resolution has been increased to 4K and 8K and live video (also including near-live) is required, transmission of captured data using wireless technology is expected. In this respect, an overview of the present embodiment is described with an example of a system that transmits a live video of sports and the like in a wireless manner.

FIG. 1 is a diagram illustrating a wireless transmission system as an example of an information processing system according to the present embodiment. A camera installed on a platform is arranged in a venue (for example, a sports facility) where imaging takes plate. Although four cameras are shown in the example of FIG. 1, the number of cameras may be less than or more than four. The camera has a wireless communication function, and can transmit captured data (for example, image data or metadata) to the server device using high frequency radio waves such as millimeter waves. The platform can change the posture of the camera. For example, the platform can pan (horizontally move) and tilt (vertically move) the camera. The information processing apparatus is, for example, an analysis apparatus that analyzes an image (video) captured by the camera. The information processing apparatus may be an apparatus built in the camera or an apparatus externally attached to the camera.

Furthermore, a base station device is installed in the venue where imaging takes plate. The base station device and the camera are wirelessly connected. In addition, the base station device is connected to the server apparatus via a network such as a core network or the Internet. The server device is an imaging control device that controls imaging by the camera. For example, the server device controls manipulation of the platform via the network to pan and tilt the camera. In addition, the server device controls the operation of the camera via the network to zoom the image captured by the camera. In the following description, control of pan (P)/tilt (T)/zoom (Z) of the camera may be referred to as PTZ control.

Note that, in the fifth generation mobile communication system (5G), a concept of network slicing is introduced in order to provide communication services optimized for various communication characteristics according to use cases. Here, the network slicing is a concept constituting a network slice, which is a logical resource partition for virtually separating and managing and/or operating network functions. For example, in the network slice, an operation of changing the unit of sending data according to the intended use of the virtually separated slice is contemplated. In the following description, a network slice may be simply referred to as a slice.

In the present embodiment, the network connecting the base station device and the server device is divided into a plurality of slices having different quality related to latency. In the example of FIG. 1, the network is divided into three: a low-latency slice, a best-effort slice, and a large-capacity slice. The low-latency slice enables communication with lower latency than the best-effort slice and the large-capacity slice. Meanwhile, the best-effort slice enables communication with lower latency than the large-capacity slice. Note that FIG. 1 is merely an example, and the slices are not limited to the aforementioned slices.

In order to enable the server device to perform high-quality imaging control, the present embodiment enables the camera and/or the base station to select the slice used for transmission according to the type or the intended use of the transmission information transmitted from the camera to the server device. For example, the camera and/or the base station is/are enabled to selectively use the plurality of slices having different latency qualities, between transmission of data (for example, camera position and angle of view information; hereinafter referred to as imaging control information) used for processes related to imaging control, and transmission of other data (for example, captured image information).

In order to achieve this, the information processing apparatus associates information regarding a slice (for example, the identification information of the slice) in which the transmission information is to be used for transmission with the transmission information, on the basis of the type or the intended use of the transmission information. For example, in the example of FIG. 1, in a case where the transmission information is the information for imaging control, the information processing apparatus associates the identification information of the low-latency slice with the transmission information. On the other hand, in a case where the transmission information is the captured image information, the identification information of the best-effort slice or the large-capacity slice is associated. Note that, in the following description, information associated with the transmission information is referred to as slice-related information. Here, the slice-related information is information for identifying a slice in which the transmission information is to be used for transmission. The camera and/or the base station transmits the transmission information to the server device by using the slice identified by the slice-related information.

With this arrangement, the server device that carries out the imaging control is enabled to acquire the information for imaging control with low latency, whereby the imaging control can be readily carried out. As a result, high-quality imaging control (for example, timely imaging control) is achieved.

The outline of the present embodiment has been described above, and the information processing system according to the present embodiment is described hereinafter in detail.

2. CONFIGURATION OF INFORMATION PROCESSING SYSTEM

Figure 2:
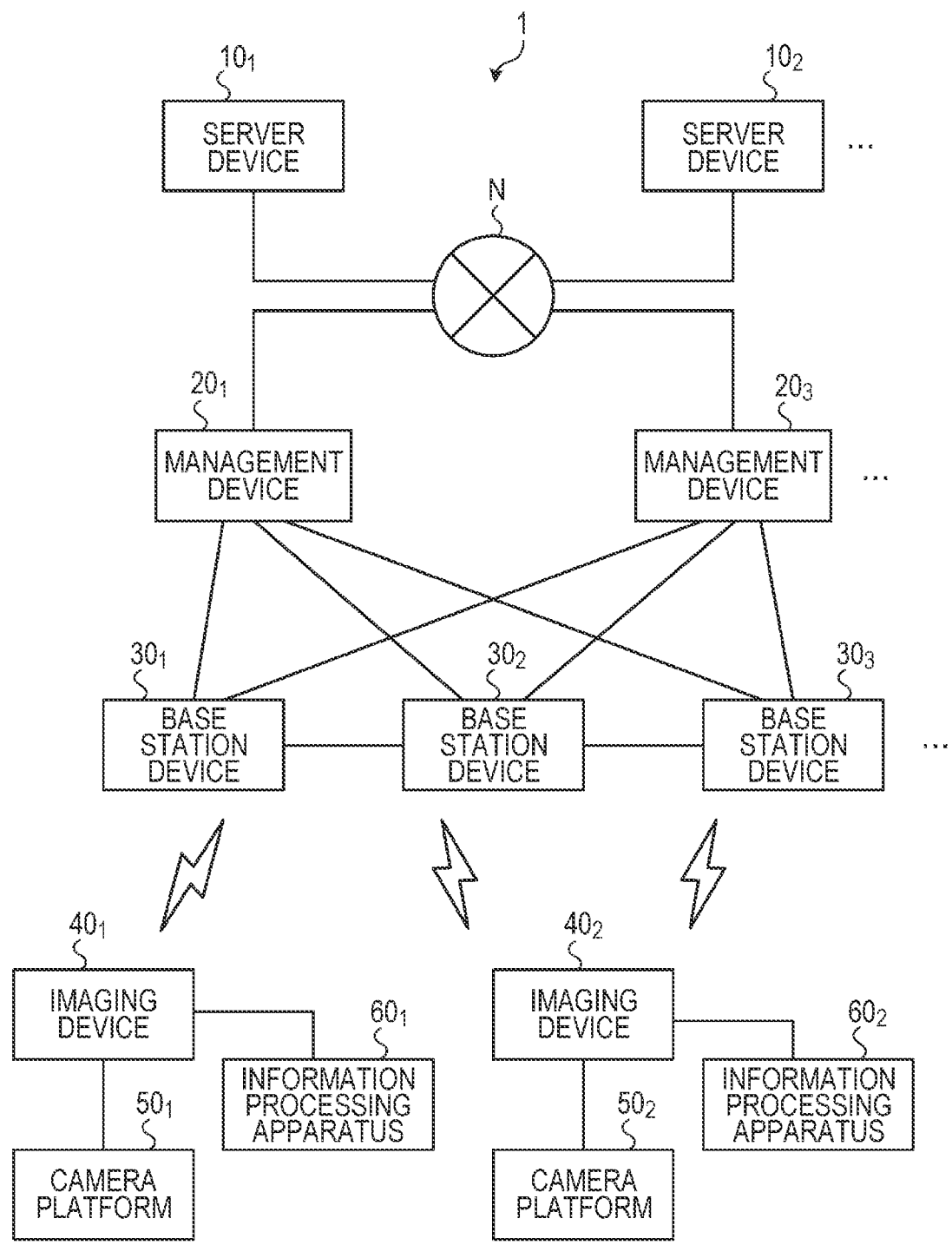
FIG. 2 is a diagram illustrating a configuration example of the information processing system according to an embodiment of the present disclosure.

FIG. 2 is a diagram illustrating a configuration example of the information processing system 1 according to an embodiment of the present disclosure. An information processing system 1 transmits captured data (for example, image data or metadata) captured by an imaging device 40 to a server device 10 via a base station device 30 and a management device 20. The imaging device 40 and the base station device 30 can be wirelessly connected using a wireless access technology, for example, the LTE, the NR, and the like.

Note that the base station device 30 may be connectable to the imaging device 40 via a relay device. In the following description, the relay device may be referred to as the base station device 30. A reference to the base station device 30 in the following description can be replaced with a relay device as appropriate.

The imaging device 40 wirelessly transmits the captured data to the base station device 30 using radio waves in a high frequency band (for example, 3.6 GHz to 45 GHz, desirably 6 GHz to 45 GHz). For example, the imaging device 40 wirelessly transmits the captured data to the base station device 30 using radio waves in a millimeter wave band (for example, 28 GHz band). The imaging device 40 may also be configured to wirelessly transmit the captured data using radio waves in a frequency band used in the 4G/LTE (for example, a band from 700 MHz to 3.5 GHz) or Sub-6 for the 5G (a frequency band of less than 6 GHz).

Note that, in the following description, "LTE" includes the LTE-Advanced (LTE-A), the LTE-Advanced Pro (LTE-A Pro), and the evolved universal Terrestrial Radio Access (EUTRA). Meanwhile, the NR includes the new radio access technology (NRAT) and the further EUTRA (FEUTRA). Note that a single base station may manage a plurality of cells. In the following description, a cell corresponding to the LTE is referred to as an LTE cell, and a cell corresponding to the NR is referred to as an NR cell.

The NR is a next generation (fifth generation) wireless access technology of the LTE (fourth generation communication including the LTE-Advanced and the LTE-Advanced Pro). The NR is a wireless access technology that can be used in various use cases including the enhanced mobile broadband (eMBB), the massive machine type communications (mMTC), and the ultra-reliable and low latency communications (URLLC). The NR has been contemplated in the aim of a technical framework responding to usage scenarios, requirement conditions, deployment scenarios, and the like in these use cases.

Note that the imaging device 40 and the base station device 30 may also carry out wireless communication using the wireless access technology other than the LTE and the NR. For example, the imaging device 40 and the base station device 30 may either carry out the low power wide area (LPWA) communication or wireless communication of a proprietary standard.

Here, the LPWA communication refers to wireless communication that enables low-power wide-range communication. For example, the LPWA wireless communication is Internet of Things (IoT) wireless communication using specific low power wireless technology (for example, 920 MHz band) or the industry-science-medical (ISM) band. Note that the LPWA communication used by the imaging device 40 and the base station device 30 may conform to the LPWA standard. Examples of the LPWA standard include the ELTRES, the ZETA, the SIGFOX, the LoRaWAN, the NB-Iot, and the like. Naturally, the LPWA standard is not limited thereto, and may be another LPWA standard.

The captured data transmitted to the base station device 30 is transmitted to the server device 10 via the network N. The server device 10 is an information processing apparatus that executes various processes on the captured data captured by the imaging device 40. For example, the server device 10 is an information processing apparatus provided in a production-side system that edits the image data included in the captured data. Alternatively, the server device 10 is, for example, an information processing apparatus provided in a broadcasting system that broadcasts edited image data on the basis of the metadata included in the captured data.

The network N is a communication network such as a local area network (LAN), a wide area network (WAN), a telephone network (mobile telephone network, fixed telephone network, and the like), a regional Internet protocol (IP) network, or the Internet. The network N may include a wired network and a wireless network. In addition, the network N may include a core network. The core network is, for example, an evolved packet core (EPC) or a 5G core network (5GC). Naturally, the network N may be a data network connected to the core network.

Note that, although only one network N is illustrated in the example of FIG. 2, different data networks may exist in respective core networks. The data network may be a service network of a telecommunications carrier, for example, an IP multimedia subsystem (IMS) network. Alternatively, the data network may be a private network such as an intra-company network.

Hereinafter, the configuration of the information processing system 1 is specifically described.

As illustrated in FIG. 2, the information processing system 1 includes the server device 10, the management device 20, the base station device 30, the imaging device 40, the camera platform 50, and the information processing apparatus 60. The information processing system 1 enables transmission of the captured data captured by the imaging device 40 to the server device 10, by a plurality of wireless communication devices constituting the information processing system 1 operating in cooperation. Note that the wireless communication device is a device having a wireless communication function. In the example of FIG. 2, at least the base station device 30 and the imaging device 40 fall under the wireless communication device.

Figure 5:
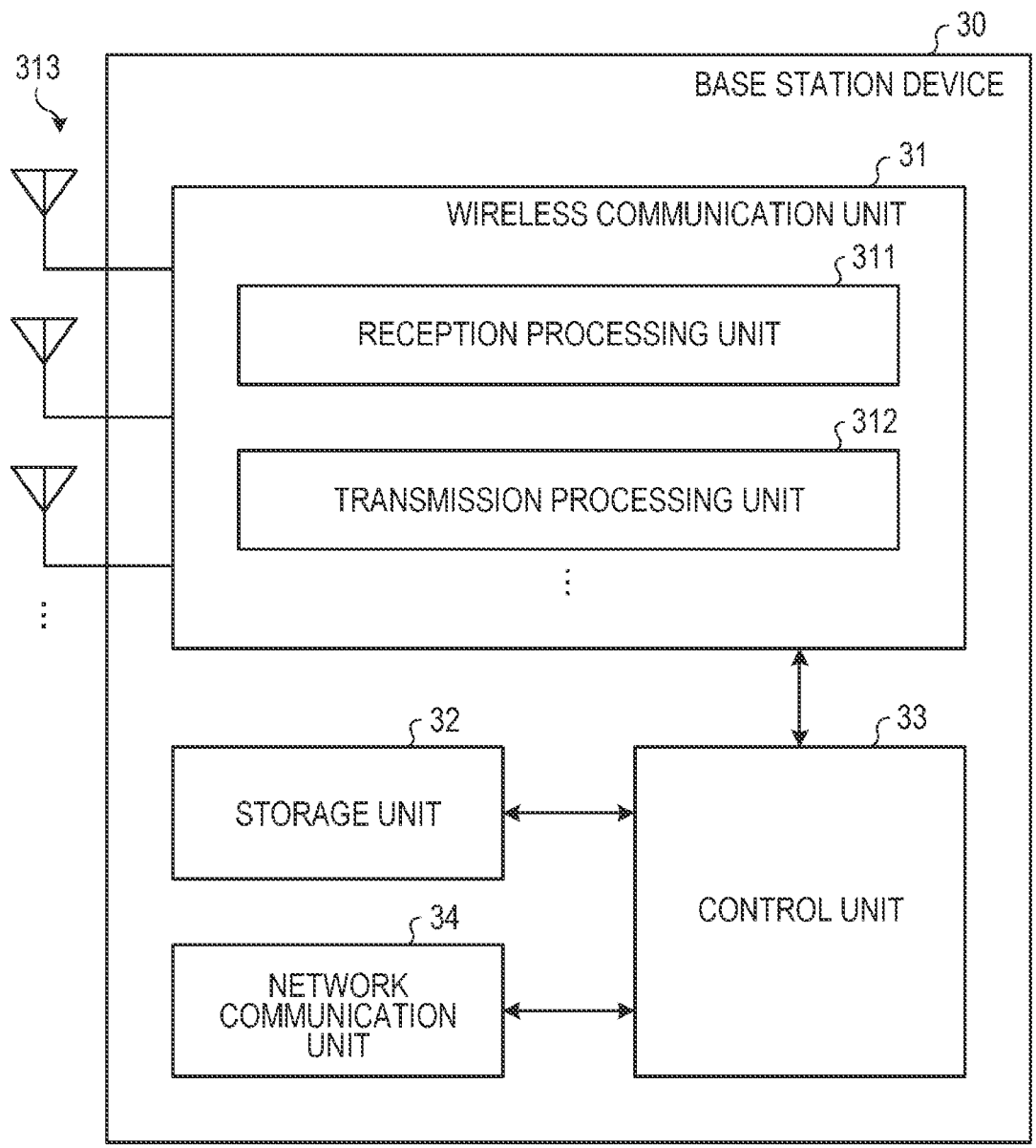
FIG. 5 is a diagram illustrating a configuration example of a base station device according to an embodiment of the present disclosure.

The information processing system 1 may include a plurality of server devices 10, a plurality of management devices 20, a plurality of base station devices 30, a plurality of imaging devices 40, a plurality of camera platforms 50, and a plurality of information processing apparatuses 60. In the example of FIG. 5, the information processing system 1 is provided with server devices $10_1$, $10_2$, and the like as the server device 10. In addition, the information processing system 1 is provided with management devices $20_1$, $20_2$, and the like as the management device 20, and includes base station devices $30_1$, $30_2$, $30_3$, and the like as the base station device 30. Furthermore, the information processing system 1 is provided with imaging devices $40_1$, $40_2$, and the like as the imaging device 40, and includes platforms $50_1$, $50_2$, and the like as the platform 50. Furthermore, the information processing system 1 is provided with information processing apparatuses $60_1$, $60_2$ and the like as the information processing apparatus 60.

Note that the devices in the drawings may be considered as logical devices. In other words, a part of the device in the drawing may be implemented by a virtual machine (VM), a container, a docker, or the like, and they may be implemented on the same physical hardware.

Note that an LTE base station may be referred to as an evolved node B (eNodeB) or an eNB. Furthermore, an NR base station may be referred to as a next generation RAN node (NGRAN node), a gNodeB, or a gNB. In addition, in the LTE and the NR, a terminal device may be referred to as a user equipment (UE). In the example of FIG. 2, at least the imaging device 40 is a terminal device. The terminal device is a type of the communication device, and is also referred to as a mobile station if the terminal device is movable.

In the present embodiment, the concept of the communication device encompasses not only a portable mobile device (terminal device) such as a mobile terminal, but also a device installed in a structure or a mobile body. The structure or the mobile body itself may be considered as the communication device. In addition, the concept of the communication device encompasses not only the terminal device but also the base station device and the relay device. The communication device is a type of the information processing apparatus. The communication device can be reworded as a transmission device or a reception device.

Hereinafter, a configuration of each device constituting the information processing system 1 is specifically described. Note that the configuration of each device described below is merely an example. The configuration of each device may be different from the following configuration.

2-1. Configuration of Server Device

First, a configuration of the server device 10 is described.

The server device 10 is an information processing apparatus (computer) that executes various processes on the captured data captured by the imaging device 40. For example, the server device 10 is an information processing apparatus provided in the production-side system. Alternatively, the server device 10 is an information processing apparatus provided in the broadcast system. The server device 10 may be a PC server, a midrange server, or a mainframe server. The server device 10 carries out an editing process of image data (video data) included in the captured data. Alternatively, the server device 10 carries out a broadcasting process of the image data having been subjected to the editing process, on the basis of the metadata included in the captured data. Naturally, the processes carried out by the server device 10 are not limited thereto. Various information processing apparatuses that carry out processes on the basis of the captured data can be considered as the server device 10.

Figure 3:
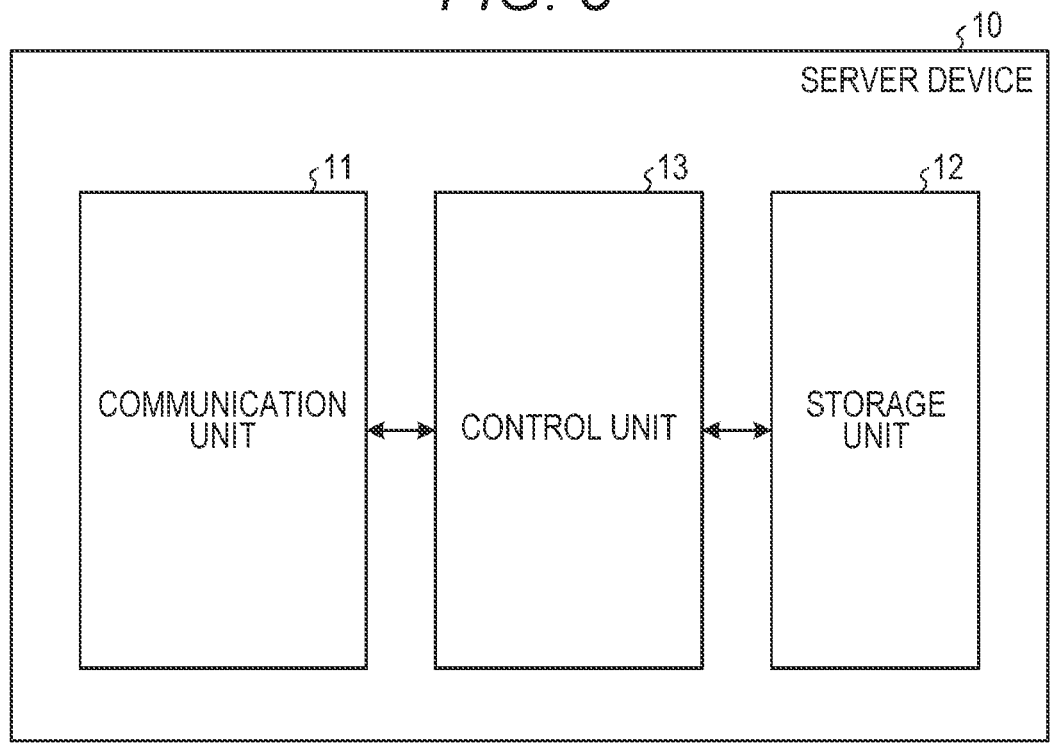
FIG. 3 is a diagram illustrating a configuration example of a server device according to an embodiment of the present disclosure.

FIG. 3 is a diagram illustrating a configuration example of a server device 10 according to an embodiment of the present disclosure. The server device 10 includes a communication unit 11, a storage unit 12, and a control unit 13. Note that the configuration illustrated in FIG. 3 is a functional configuration, and the hardware configuration may be different therefrom. Furthermore, the function of the server device 10 may be implemented in a distributed manner in a plurality of physically separate configurations. For example, the server device 10 may include a plurality of server devices.

The communication unit 11 is a communication interface for communicating with other devices. The communication unit 11 may also be a network interface or a device connection interface. For example, the communication unit 11 may be either a local area network (LAN) interface such as a network interface card (NIC), or a USB interface configured with a universal serial bus (USB) host controller, a USB port, and the like. Furthermore, the communication unit 11 may be either a wired interface or a wireless interface. The communication unit 11 functions as a communication means of the server device 10. The communication unit 11 communicates with the base station device 30 under the control of the control unit 13.

The storage unit 12 is a data readable/writable storage device such as a dynamic random access memory (DRAM), a static random access memory (SRAM), a flash memory, or a hard disk. The storage unit 12 functions as a storage means of the server device 10. The storage unit 12 stores, for example, the captured data (for example, image data or metadata) transmitted from the imaging device 40 via the base station device 30.

The control unit 13 is a controller that controls each unit of the server device 10. The control unit 13 is implemented by, for example, a processor such as a central processing unit (CPU) or a micro processing unit (MPU). For example, the control unit 13 is implemented by the processor executing various programs stored in the storage device inside the server device 10 using a random access memory (RAM) and the like as a work area. Note that the control unit 13 may be implemented by an integrated circuit such as an application specific integrated circuit (ASIC) or a field programmable gate array (FPGA). Any of the CPU, the MPU, the ASIC, and the FPGA may be regarded as a controller.

2-2. Configuration of Management Device

Next, a configuration of the management device 20 is described.

The management device 20 is a device that manages a wireless network. For example, the management device 20 is a device that manages communication of the base station device 30. When the core network is the EPC, the management device 20 is, for example, a device having a function as a mobility management entity (MME). Alternatively, when the core network is the 5GC, the management device 20 is, for example, a device having a function as an access and mobility management function (AMF) and/or a session management function (SMF). Naturally, the functions of the management device 20 are not limited to the MME, the AMF, and the SMF. For example, when the core network is the 5GC, the management device 20 may also be a device having a function as a network slice selection function (NSSF), an authentication server function (AUSF), or a unified data management (UDM). In addition, the management device 20 may also be a device having a function as a home subscriber server (HSS).

Note that the management device 20 may also have a function of a gateway. For example, when the core network is the EPC, the management device 20 may have a function as a serving gateway (S-GW) or a packet data network gateway (P-GW). Furthermore, when the core network is the 5GC, the management device 20 may also have a function as a user plane function (UPF). Note that the management device 20 is not necessarily a device constituting the core network. For example, it is assumed that the core network is a core network of the wideband code division multiple access (W-CDMA) or the code division multiple access 2000 (cdma2000). In this case, the management device 20 may be a device that functions as a radio network controller (RNC).

Figure 4:
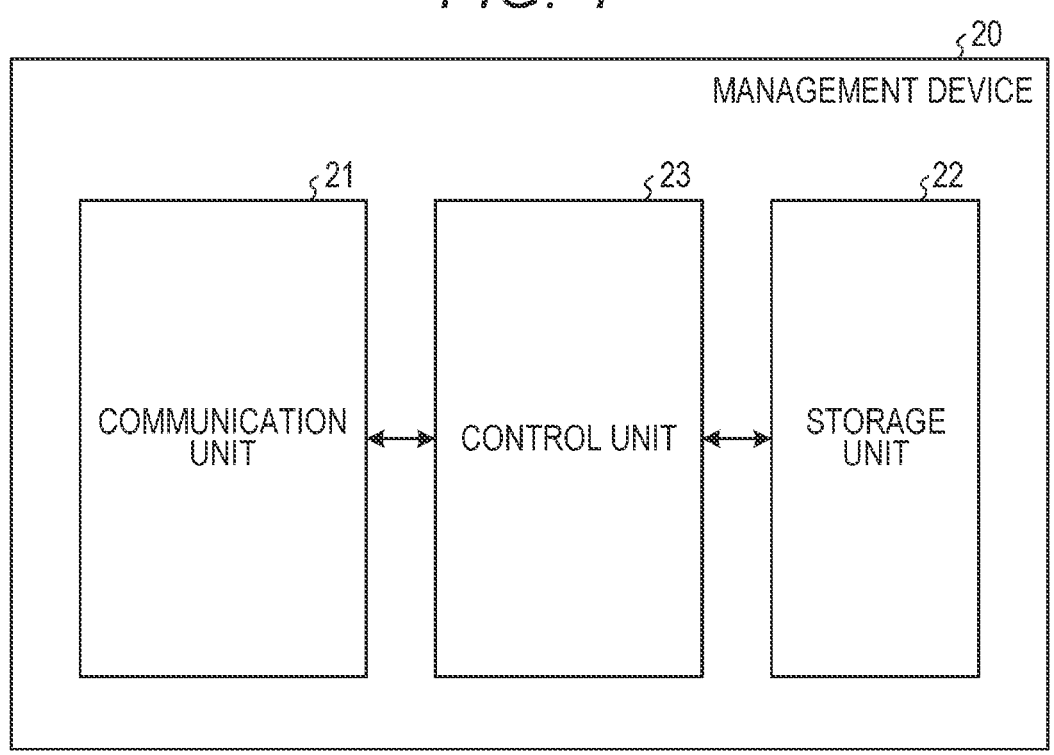
FIG. 4 is a diagram illustrating a configuration example of a management device according to an embodiment of the present disclosure.

FIG. 4 is a diagram illustrating a configuration example of a management device 20 according to an embodiment of the present disclosure. The management device 20 includes a communication unit 21, a storage unit 22, and a control unit 23. Note that the configuration illustrated in FIG. 4 is a functional configuration, and the hardware configuration may be different therefrom. Furthermore, the function of the management device 20 may be implemented in a distributed manner in a plurality of physically separate configurations. For example, the management device 20 may be configured with a plurality of server devices.

The communication unit 21 is a communication interface for communicating with other devices. The communication unit 21 may also be a network interface or a device connection interface. For example, the communication unit 21 may be a LAN interface such as an NIC, or may be a USB interface configured with a USB host controller, a USB port, or the like. Furthermore, the communication unit 21 may be either a wired interface or a wireless interface. The communication unit 21 functions as a communication means of the management device 20. The communication unit 21 communicates with the server device 10, another management device 20, and the base station device 30 under the control of the control unit 23.

The storage unit 22 is a storage device capable of reading and writing data, such as a DRAM, an SRAM, a flash memory, or a hard disk. The storage unit 22 functions as a storage means of the management device 20. The storage unit 22 stores, for example, a connection state of the imaging device 40. For example, the storage unit 22 stores the RRC state and the ECM state of the imaging device 40. The storage unit 22 may function as a home memory that stores the positional information of the imaging device 40.

The control unit 23 is a controller that controls each unit of the management device 20. The control unit 23 is implemented by, for example, a processor such as a CPU and an MPU. For example, the control unit 23 is implemented by the processor executing various programs stored in the storage device inside the management device 20 using a RAM and the like as a work area. Note that the control unit 23 may be implemented by an integrated circuit such as an ASIC and an FPGA. Any of the CPU, the MPU, the ASIC, and the FPGA may be regarded as a controller.

2-3. Configuration of Base Station Device

Next, a configuration of the base station device 30 is described.

The base station device 30 is a wireless communication device that wirelessly communicates with the imaging device 40. The base station device 30 is configured to be able to switch the network slices. The base station device 30 is installed, for example, in a venue where the imaging device 40 carries out imaging (hereinafter referred to as an imaging venue). Examples of the imaging venue include sports facilities and concert halls. Note that examples of the sports facility include a football stadium, a baseball stadium, a gymnasium, and a tennis facility. Naturally, the imaging venue is not limited thereto, and various venues where a transmission service (for example, live relay) of the captured data is carried out using the base station device 30 can be considered as the imaging venue.

The base station device 30 is a type of the communication device. More specifically, the base station device 30 is a device corresponding to a wireless base station (Node B, eNB, gNB, and the like) or a wireless access point. The base station device 30 may also be a wireless relay station. Furthermore, the base station device 30 may be an optical extension device called a remote radio head (RRH). Furthermore, the base station device 30 may also be a receiving station device such as a field pickup unit (FPU). Furthermore, the base station device 30 may be an integrated access and backhaul (IAB) donor node or an IAB relay node that provides a wireless access line and a wireless backhaul line through time division multiplexing, frequency division multiplexing, or space division multiplexing.

Note that the wireless access technology used by the base station device 30 may be a cellular communication technology or a wireless LAN technology. Naturally, the wireless access technology used by the base station device 30 is not limited thereto, and may be another wireless access technology. For example, the wireless access technology used by the base station device 30 may be the LPWA communication technology. Naturally, the wireless communication used by the base station device 30 may be wireless communication using millimeter waves. Furthermore, the wireless communication used by the base station device 30 may be wireless communication using radio waves or wireless communication using infrared rays or visible light (optical wireless communication).

The base station device 30 may be capable of non-orthogonal multiple access (NOMA) communication with the imaging device 40. Here, the NOMA communication refers to communication (transmission, reception, or both) using a non-orthogonal resource. Note that the base station device 30 may be capable of the NOMA communication with another base station device 30.

Note that the base station devices 30 may be capable of communicating with each other via a base station device-core network interface (for example, S1 Interface and the like). This interface may be either wired or wireless. Furthermore, the base station devices may be capable of communicating with each other via an inter-base station device interface (for example, the X2 Interface, the S1 Interface, and the like). This interface may be either wired or wireless.

Note that the concept of the base station device (also referred to as a base station) encompasses not only a donor base station but also a relay base station (also referred to as a relay station or a relay station device). In addition, the concept of the base station encompasses not only a structure having a function of the base station but also a device installed in a structure.

The structure is, for example, a building such as a high-rise building, a house, a steel tower, a station facility, an airport facility, a harbor facility, or a stadium. Note that the concept of the structure encompasses not only a building but also a non-building structure such as a tunnel, a bridge, a dam, a wall, or an iron pillar, and equipment such as a crane, a gate, or a windmill. In addition, the concept of the structure encompasses not only a structure on land (on the ground in a narrow sense) or in the ground, but also a structure on water such as a pier or a megafloat, and a structure under water such as a marine observation facility. The base station device can be reworded as an information processing apparatus.

The base station device 30 may be either a donor station or a relay station (repeater station). Furthermore, the base station device 30 may be a fixed station or a mobile station. The mobile station is a wireless communication device (for example, the base station device) configured to be movable. In this case, the base station device 30 may be a device installed in a mobile body or a mobile body itself. For example, a relay station device having mobility can be considered as the base station device 30 as a mobile station. In addition, a device that is originally capable of moving, such as a vehicle, a drone, or a smartphone, and has a function of a base station device (at least a part of the function of the base station device) also falls under the base station device 30 as a mobile station.

Here, the mobile body may be a mobile terminal such as a smartphone or a mobile phone. In addition, the mobile body may be a mobile body that moves on land (on the ground in a narrow sense) (for example, a vehicle such as an automobile, a bicycle, a bus, a truck, a motorcycle, a train, or a linear motor car) or a mobile body that moves in the ground (for example, in the tunnel) (for example, the subway).

In addition, the mobile body may be a mobile body that moves over water (for example, a ship such as a passenger ship, a cargo ship, or a hovercraft) or a mobile body that moves under water (for example, a submergence vessel such as a submersible, a submarine, and an unmanned submersible).

Furthermore, the mobile body may be a mobile body that moves inside the atmosphere (for example, an aircraft such as an airplane, an airship, or a drone) or a mobile body that moves outside the atmosphere (for example, an artificial astral body such as an artificial satellite, a spacecraft, a space station, and a probe). The mobile body moving outside the atmosphere can be reworded as a space mobile body.

Furthermore, the base station device 30 may be a ground base station device (ground station device) installed on the ground. For example, the base station device 30 may be a base station device arranged in a structure on the ground, or may be a base station device installed in a mobile body moving on the ground. More specifically, the base station device 30 may be an antenna installed in a structure such as a building and a signal processing device connected to the antenna. Naturally, the base station device 30 may also be the structure or the mobile body itself. The expression "on the ground" refers to a state of being on the ground in a broad sense, that is, not only on land (ground in a narrow sense), but also underground, on water, and under water. Note that the base station device 30 is not limited to the ground base station device. The base station device 30 may also be a non-ground base station device (non-ground station device) capable of floating in the air or space. For example, the base station device 30 may be an aircraft station device or a satellite station device.

The aircraft station device is a wireless communication device capable of floating in the atmosphere, such as an aircraft. The aircraft station device may be a device mounted on an aircraft and the like, or may be an aircraft itself. Note that the concept of the aircraft encompasses not only an aerodyne such as an airplane and a glider, but also an aerostat such as a balloon and an airship. In addition, the concept of the aircraft encompasses not only an aerodyne and an aerostat, but also a rotorcraft such as a helicopter and an autogyro. Note that the aircraft station device (or an aircraft on which an aircraft station device is mounted) may be an unmanned aircraft such as a drone.

Note that the concept of the unmanned aerial vehicle also encompasses an unmanned aircraft system (UAS) and a tethered unmanned aircraft system (tethered UAS). Furthermore, the concept of the unmanned aerial vehicle encompasses a lighter than air (LTA) UAS, and a heavier than air (HTA) UAS. In addition to the foregoing, the concept of the unmanned aerial vehicle also encompasses high altitude UAS platforms (HAPs).

The satellite station device is a wireless communication device capable of floating outside the atmosphere. The satellite station device may be a device mounted on a space mobile body such as an artificial satellite, or may be a space mobile body itself. The satellite serving as the satellite station device may be any of a low earth orbiting (LEO) satellite, a medium earth orbiting (MEO) satellite, a geostationary earth orbiting (GEO) satellite, and a highly elliptical orbiting (HEO) satellite. Naturally, the satellite station device may be a device mounted on a low earth orbiting satellite, a middle earth orbiting satellite, a geostationary earth orbiting satellite, or a highly elliptical orbiting satellite.

The coverage of the base station device 30 may be as large as a macro cell or as small as a picocell. Naturally, the coverage of the base station device 30 may be as extremely small as a femtocell. Furthermore, the base station device 30 may have a beamforming capability. In this case, the base station device 30 may form a cell or a service area for every beam.

FIG. 4 is a diagram illustrating a configuration example of the base station device 30 according to an embodiment of the present disclosure. The base station device 30 is provided with a wireless communication unit 31, a storage unit 32, a control unit 33, and a network communication unit 34. Note that the configuration illustrated in FIG. 4 is a functional configuration, and the hardware configuration may be different therefrom. Furthermore, the functions of the base station device 30 may be implemented in a distributed manner in a plurality of physically separated configurations.

The wireless communication unit 31 is a signal processing unit for wirelessly communicating with other wireless communication devices (for example, the imaging device 40). The wireless communication unit 31 operates under the control of the control unit 33. The wireless communication unit 31 supports one or a plurality of wireless access methods. For example, the wireless communication unit 31 is supports both the NR and the LTE. The wireless communication unit 31 may support the W-CDMA or the cdma2000 in addition to the NR or the LTE. Furthermore, the wireless communication unit 31 may support an automatic retransmission technology such as the hybrid automatic repeat request (HARQ).

The wireless communication unit 31 is provided with a reception processing unit 311, a transmission processing unit 312, and an antenna 313. The wireless communication unit 31 may be provided with a plurality of reception processing units 311, a plurality of transmission processing units 312, and a plurality of antennas 313. Note that, in a case where the wireless communication unit 31 supports the plurality of wireless access methods, each unit of the wireless communication unit 31 can be configured individually for each wireless access method. For example, the reception processing unit 311 and the transmission processing unit 312 may be individually configured for the LTE and the NR. Furthermore, the antenna 313 may be configured with a plurality of antenna elements (for example, a plurality of patch antennas). In this case, the wireless communication unit 31 may be configured to be capable of beamforming. The wireless communication unit 31 may be configured to enable polarization beamforming using vertically polarized waves (V-polarized waves) and horizontally polarized waves (H-polarized waves).

The reception processing unit 311 processes an uplink signal received via the antenna 313. For example, the reception processing unit 311 carries out down-conversion, removal of an unnecessary frequency component, control of an amplification level, quadrature demodulation, conversion to a digital signal, removal of a guard interval (cyclic prefix), extraction of a frequency domain signal by fast Fourier transform, and the like on the uplink signal. Then, the reception processing unit 311 separates an uplink channel such as a physical uplink shared channel (PUSCH) and a physical uplink control channel (PUCCH), and an uplink reference signal from the signals having been subjected to these processes. Furthermore, the reception processing unit 311 demodulates the received signal using a modulation method such as the binary phase shift keying (BPSK) or the quadrature phase shift keying (QPSK) with respect to the modulation symbol of the uplink channel. The modulation method used for the demodulation may be the 16 quadrature amplitude modulation (16QAM), 64QAM, or 256QAM. In this case, the signal points on the constellation do not necessarily have to be at the same distance. The constellation may be a non-uniform constellation (NUC). Then, the reception processing unit 311 carries out a decoding process on the demodulated encoded bits of the uplink channel. The decoded uplink data and uplink control information are output to the control unit 33.

The transmission processing unit 312 carries out a transmission process of the downlink control information and the downlink data. For example, the transmission processing unit 312 encodes the downlink control information and the downlink data having been input from the control unit 33 using an encoding method such as block encoding, convolutional encoding, and turbo encoding. Then, the transmission processing unit 312 modulates the coded bits by a predetermined modulation method such as the BPSK, the QPSK, the 16QAM, the 64QAM, and the 256QAM. In this case, the signal points on the constellation do not necessarily have to be at the same distance. The constellation may be a non-uniform constellation. Then, the transmission processing unit 312 multiplexes the modulation symbol of each channel and the downlink reference signal, and arranges the multiplexed symbol in a predetermined resource element. Then, the transmission processing unit 312 carries out various types of signal processes on the multiplexed signal. For example, the transmission processing unit 312 carries out a process such as conversion into a time domain by fast Fourier transform, addition of a guard interval (cyclic prefix), generation of a baseband digital signal, conversion into an analog signal, quadrature modulation, up-conversion, removal of an extra frequency component, and amplification of power. The signal generated by the transmission processing unit 312 is transmitted from the antenna 313.

The antenna 313 is an antenna device (antenna unit) that converts an electric current to radio waves and vice versa. The antenna 313 may be configured with one antenna element (for example, one patch antenna), or may be configured with a plurality of antenna elements (for example, a plurality of patch antennas). In a case where the antenna 313 is configured with a plurality of antenna elements, the wireless communication unit 31 may be configured to be capable of beamforming. For example, the wireless communication unit 31 may be configured to generate a directional beam by controlling the directivity of a wireless signal using a plurality of antenna elements. Note that the antenna 313 may be a dual-polarized antenna. In a case where the antenna 313 is a dual-polarized antenna, the wireless communication unit 31 may use vertically polarized waves (V-polarized waves) and horizontally polarized waves (H-polarized waves) in transmission of the wireless signals. Then, the wireless communication unit 31 may control the directivity of the wireless signal transmitted using the vertically polarized waves and the horizontally polarized waves.

The storage unit 32 is a storage device capable of reading and writing data, such as a DRAM, an SRAM, a flash memory, or a hard disk. The storage unit 32 functions as a storage means of the base station device 30.

The control unit 33 is a controller that controls each unit of the base station device 30. The control unit 33 is implemented by, for example, a processor such as a central processing unit (CPU) and a micro processing unit (MPU). For example, the control unit 33 is implemented by the processor executing various programs stored in the storage device inside the base station device 30 using a random access memory (RAM) or the like as a work area. Note that the control unit 33 may be implemented by an integrated circuit such as an application specific integrated circuit (ASIC) or a field programmable gate array (FPGA). Any of the CPU, the MPU, the ASIC, and the FPGA may be regarded as a controller.

The network communication unit 34 is a communication interface for communicating with other devices. For example, the network communication unit 34 is a LAN interface such as an NIC. The network communication unit 34 may be either a wired interface or a wireless interface. The network communication unit 34 functions as a network communication means of the base station device 30. The network communication unit 34 communicates with the management device 20 under the control of the control unit 33.

2-4. Configuration of Imaging Device

Next, a configuration of the imaging device 40 is described.

The imaging device 40 is a terminal device having a wireless communication function and an imaging function. For example, the imaging device 40 is an industrial camera having a wireless communication function. The imaging device 40 carries out wireless communication with the base station device 30. The imaging device 40 is a type of the communication device. The imaging device 40 is installed in the imaging venue (for example, sports facilities) and transmits captured data (for example, sports video) to the server device 10 via the base station device 30.

Note that the imaging device 40 may be capable of the NOMA communication with the base station device 30. Furthermore, the imaging device 40 may use an automatic retransmission technology such as the HARQ when communicating with the base station device 30. The imaging device 40 may be capable of sidelink communication with another imaging device 40. The imaging device 40 may also be capable of using the automatic retransmission technology such as the HARQ when carrying out sidelink communication. Note that the imaging device 40 may also be capable of the NOMA communication in communication (sidelink) with another imaging devices 40. Furthermore, the imaging device 40 may be capable of the LPWA communication with another communication device (for example, the base station device 30 and another imaging device 40). Furthermore, the wireless communication used by the imaging device 40 may be wireless communication using millimeter waves. Note that the wireless communication (including sidelink communication) used by the imaging device 40 may be either wireless communication using radio waves or wireless communication using infrared rays or visible light (optical wireless communication).

The imaging device 40 may be simultaneously connected to a plurality of base station devices or a plurality of cells to carry out communication. For example, in a case where one base station device supports a communication area via a plurality of cells (for example, pCell and sCell), it is possible to bundle the plurality of cells and carry out communication between the base station device 30 and the imaging device 40 by a carrier aggregation (CA) technology, a dual connectivity (DC) technology, or a multi-connectivity (MC) technology. Alternatively, the imaging device 40 and the plurality of base station devices 30 can communicate with each other by the coordinated multi-point transmission and reception (CoMP) technology via cells of different base station devices 30.

Figure 6:
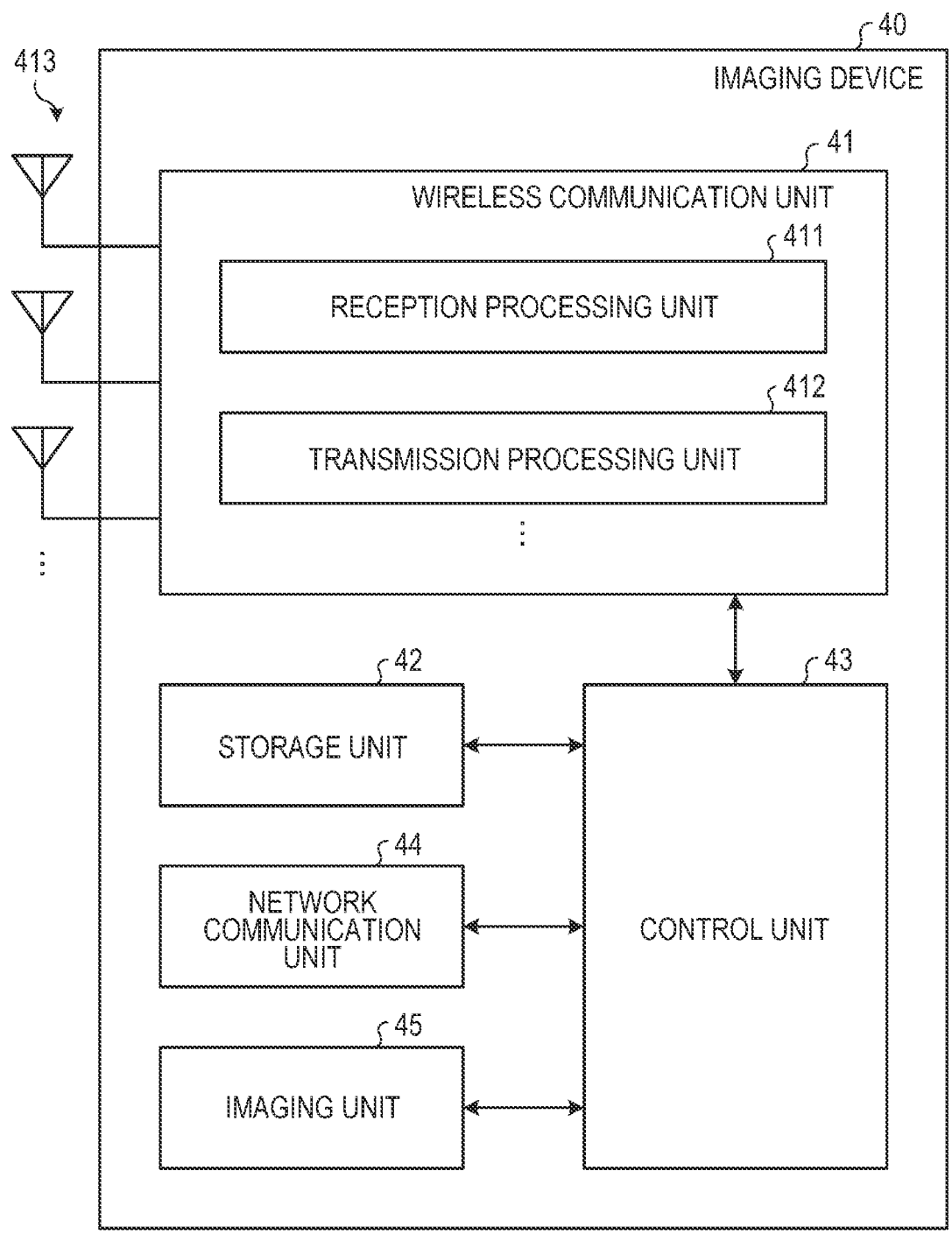
FIG. 6 is a diagram illustrating a configuration example of an imaging device according to an embodiment of the present disclosure.

FIG. 6 is a diagram illustrating a configuration example of an imaging device 40 according to an embodiment of the present disclosure. The imaging device 40 is provided with a wireless communication unit 41, a storage unit 42, a control unit 43, a network communication unit 44, and an imaging unit 45. Note that the configuration illustrated in FIG. 6 is a functional configuration, and the hardware configuration may be different therefrom. Furthermore, the function of the imaging device 40 may be implemented in a distributed manner in a plurality of physically separate configurations.

The wireless communication unit 41 is a signal processing unit for wirelessly communicating with other wireless communication devices (for example, the base station device 30 and another imaging device 40). The wireless communication unit 41 operates under the control of the control unit 43. The wireless communication unit 41 is provided with a reception processing unit 411, a transmission processing unit 412, and an antenna 413. The configurations of the wireless communication unit 41, the reception processing unit 411, the transmission processing unit 412, and the antenna 413 may be similar to those of the wireless communication unit 31, the reception processing unit 311, the transmission processing unit 312, and the antenna 313 of the base station device 30. Furthermore, the wireless communication unit 41 may be configured to be capable of beamforming, in a similar manner to the wireless communication unit 31.

Referring again to FIG. 6, the storage unit 42 is a storage device capable of reading and writing data, such as a DRAM, an SRAM, a flash memory, or a hard disk. The storage unit 42 stores the captured data (for example, image data or metadata) captured by the imaging unit 45. Note that the captured data may be in a file format. In this case, a plurality of files having different resolutions may be stored in the storage unit 42. For example, the files stored in the storage unit 42 may include a standard resolution file (for example, a file for real-time broadcasting) in which an image having a standard resolution is stored, and a high resolution file (for example, a file for editing used for creation of replays and highlights) in which an image having a resolution higher than the standard resolution is stored.

In addition, the file stored in the storage unit 42 may be configured such that the type of the image can be identified. For example, identification information for identifying a type (for example, on-air, next, and others) of an image may be added to the file stored in the storage unit 42. In this case, the files stored in the storage unit 42 may include a file in which an on-air video is recorded, a file in which a next video is recorded, and a file in which another live video which is neither the on-air video nor the next video is recorded. Here, the on-air video refers to an image (video) currently being broadcast (for example, live streamed), and the next video refers to an image (video) to be subsequently on the air. The imaging device 40 may acquire information for identifying the type of the video from, for example, the server device 10 (for example, a switcher device).

Note that, in the following description, the captured data to be transmitted by the imaging device 40 to another device (for example, the server device 10) may be referred to as a transfer file. The transfer file may be a file in which an on-air video is recorded, a file in which a next video is recorded, or a file in which another live video is recorded. Furthermore, the transfer file may be a standard resolution file or a high resolution file. The storage unit 42 functions as a storage means of the imaging device 40.

The control unit 43 is a controller that controls each unit of the imaging device 40. The control unit 43 is implemented by, for example, a processor such as a CPU or an MPU. For example, the control unit 43 is implemented by the processor executing various programs stored in the storage device inside the imaging device 40 using a RAM or the like as a work area. Note that the control unit 43 may be implemented by an integrated circuit such as an ASIC or an FPGA. Any of the CPU, the MPU, the ASIC, and the FPGA may be regarded as a controller.

The network communication unit 44 is a communication interface for communicating with other devices. For example, the network communication unit 44 is a LAN interface such as an NIC. The network communication unit 44 may be either a wired interface or a wireless interface. The network communication unit 44 functions as a network communication means of the imaging device 40. The network communication unit 44 communicates with other devices under the control of the control unit 43.

The imaging unit 45 is a conversion unit that converts an optical image into an electric signal. The imaging unit 45 includes, for example, an image sensor, a signal processing circuit that processes an analog pixel signal output from the image sensor, and the like, and converts light entering from the lens into digital data (image data). Note that the image captured by the imaging unit 45 is not limited to a video (moving image), and may be a still image.

2-5. Configuration of Camera Platform

Next, a configuration of the camera platform 50 is described.

The camera platform 50 is a camera platform on which the imaging device 40 is mounted. The camera platform 50 changes the posture of the imaging device 40. For example, the camera platform 50 includes a pan/tilt mechanism that enables pan (horizontal movement) and tilt (vertical movement) of the imaging device 40, and enables pan and tilt of the imaging device 40 by controlling the pan/tilt mechanism according to an instruction of the information processing apparatus 60. Note that the camera platform 50 may include a roll mechanism that rotates the imaging device 40.

Figure 7:
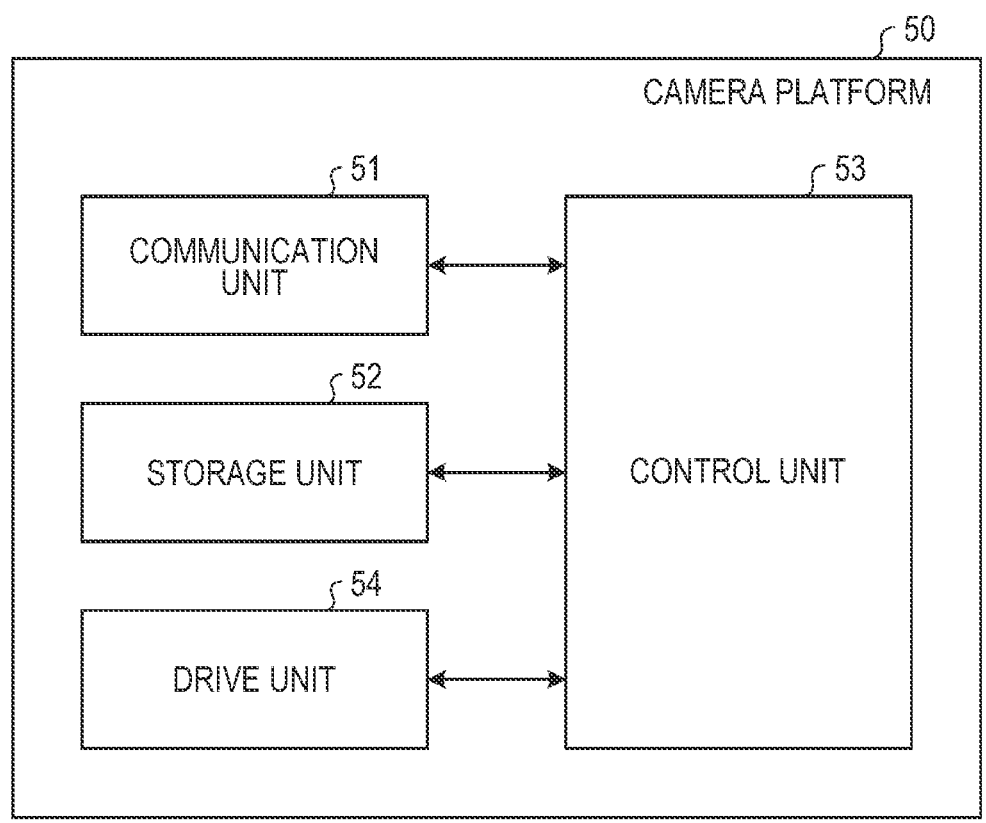
FIG. 7 is a diagram illustrating a configuration example of a camera platform according to an embodiment of the present disclosure.

FIG. 7 is a diagram illustrating a configuration example of a camera platform 50 according to an embodiment of the present disclosure. The camera platform 50 includes a communication unit 51, a storage unit 52, a control unit 53, and a drive unit 54. Note that the configuration illustrated in FIG. 7 is a functional configuration, and the hardware configuration may be different therefrom. Furthermore, the function of the camera platform 50 may be implemented in a distributed manner in a plurality of physically separate configurations.

Note that the imaging device 40 and the camera platform 50 may be either an integrated device or separate devices. In a case where the imaging device 40 and the camera platform 50 are configured to be an integrated device, the communication unit 51 of the camera platform 50 can be configured as the same block as the wireless communication unit 41 and/or the network communication unit 44 of the imaging device 40. Furthermore, in a case where the imaging device 40 and the camera platform 50 are configured to be an integrated device, the storage unit 52 of the camera platform 50 can be considered as the same block as the storage unit 42 of the imaging device 40. Furthermore, in a case where the imaging device 40 and the camera platform 50 are configured to be an integrated device, the control unit 53 of the camera platform 50 can be considered as the same block as the control unit 43 of the imaging device 40.

The communication unit 51 is a communication interface for communicating with other devices. The communication unit 51 may also be a network interface or a device connection interface. For example, the communication unit 51 may be a LAN interface such as an NIC, or may be a USB interface configured with a USB host controller, a USB port, or the like. Furthermore, the communication unit 51 may be either a wired interface or a wireless interface. The communication unit 51 functions as a communication means of the camera platform 50. The communication unit 51 communicates with the information processing apparatus 60 under the control of the control unit 53.

The storage unit 52 is a storage device capable of reading and writing data, such as a DRAM, an SRAM, a flash memory, or a hard disk. The storage unit 52 functions as a storage means of the camera platform 50.

The control unit 53 is a controller that controls each unit of the server device 10. The control unit 13 is implemented by, for example, a processor such as a CPU or an MPU. For example, the control unit 13 is implemented by the processor executing various programs stored in the storage device inside the server device 10 using a RAM or the like as a work area. Note that the control unit 53 may be implemented by an integrated circuit such as an ASIC or an FPGA. Any of the CPU, the MPU, the ASIC, and the FPGA may be regarded as a controller.

Drive unit 54 is a device that drives various mechanisms included in the camera platform 50. The drive unit 54 is, for example, a motor that drives a pan/tilt/roll mechanism. The drive unit 54 functions as a drive means for the camera platform 50. The drive unit 54 drives various mechanisms under the control of the control unit 53.

2-6. Configuration of Information Processing Apparatus

Next, a configuration of the information processing apparatus 60 is described.

The information processing apparatus 60 is a control device that controls wireless transmission of data of the imaging device 40. For example, the information processing apparatus 60 controls the wireless communication unit 41 of the imaging device 40 to control the wireless transmission of the captured data of the imaging device 40. In the example of FIG. 1, the information processing apparatus 60 corresponds to a device in a hatched block built in or externally attached to the camera. Note that if the imaging device 40 is movable, the information processing apparatus 60 may be configured to control not only the posture of the imaging device 40 but also the position of the imaging device 40.

Figure 8:
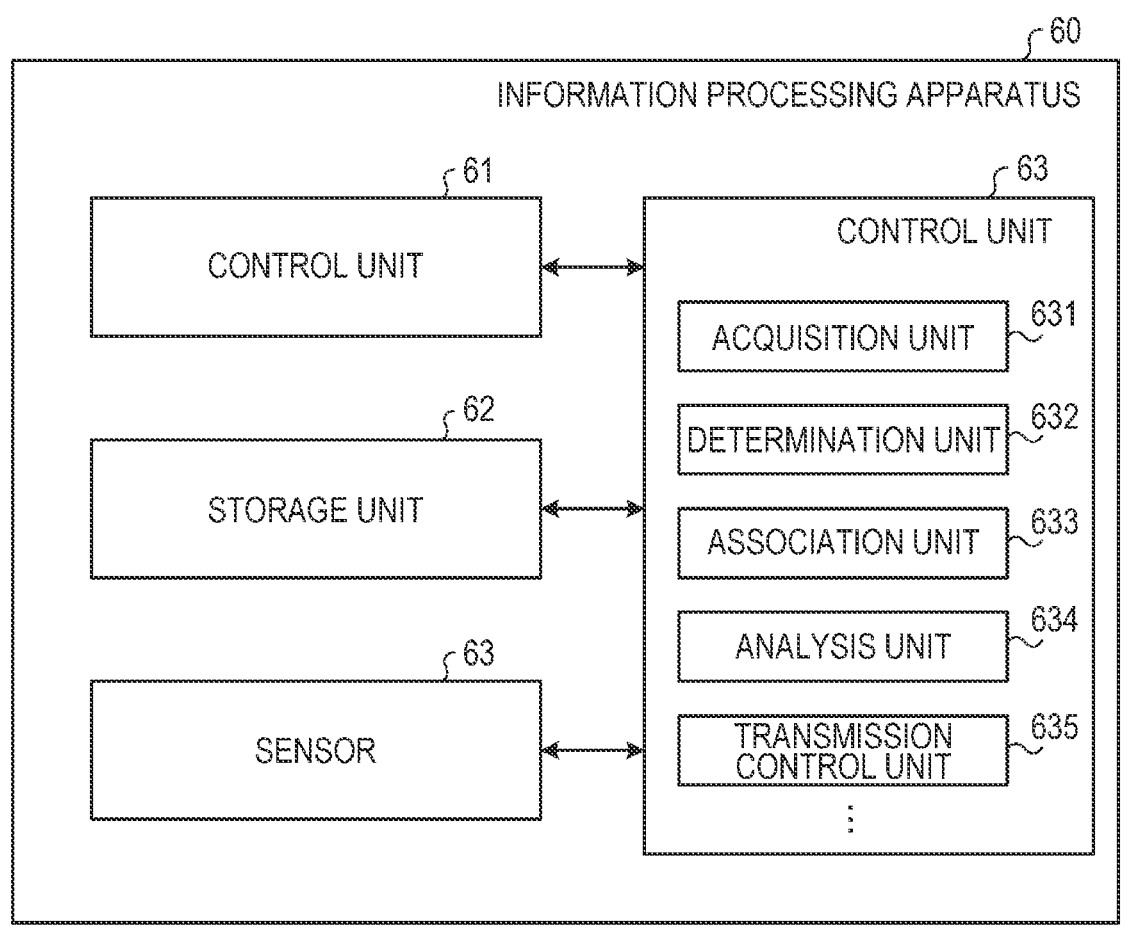
FIG. 8 is a diagram illustrating a configuration example of an information processing apparatus according to an embodiment of the present disclosure.

FIG. 8 is a diagram illustrating a configuration example of an information processing apparatus 60 according to an embodiment of the present disclosure. The information processing apparatus 60 includes a communication unit 61, a storage unit 62, and a control unit 63. Note that the configuration illustrated in FIG. 8 is a functional configuration, and the hardware configuration may be different therefrom. Furthermore, the function of the information processing apparatus 60 may be implemented in a distributed manner in a plurality of physically separate configurations.

Note that the information processing apparatus 60 may be an apparatus integrated with another apparatus. In other words, the information processing apparatus 60 may be another apparatus itself. For example, the information processing apparatus 60 may be an apparatus integrated with the camera platform 50 or an apparatus integrated with the imaging device 40. In addition, three of the imaging device 40, the camera platform 50, and the information processing apparatus 60 may be an integrated apparatus. In this case, the imaging device 40 and the camera platform 50 may be referred to as the information processing apparatus 60 as appropriate.

Note that the imaging device 40 and the camera platform 50 may be an integrated device, and the information processing apparatus 60 may be a separate apparatus. Alternatively, the imaging device 40 and the information processing apparatus 60 may be an integrated apparatus, and the camera platform 50 may be a separate device. Yet alternatively, the camera platform 50 and the information processing apparatus 60 may be an integrated apparatus, and the imaging device 40 may be a separate device.

In a case where the information processing apparatus 60 is an apparatus integrated with the camera platform 50, the communication unit 61 of the information processing apparatus 60 can be considered as the same block as the communication unit 51 of the camera platform 50. Furthermore, in a case where the information processing apparatus 60 is an apparatus integrated with the camera platform 50, the storage unit 62 of the information processing apparatus 60 can be considered as the same block as the storage unit 52 of the camera platform 50. Furthermore, in a case where the information processing apparatus 60 is an apparatus integrated with the camera platform 50, the control unit 63 of the information processing apparatus 60 can be considered as the same block as the control unit 53 of the camera platform 50.

Furthermore, in a case where the information processing apparatus 60 is an apparatus integrated with the imaging device 40, the communication unit 61 of the information processing apparatus 60 can be considered as the same block as the wireless communication unit 41 and/or the network communication unit 44 of the imaging device 40. Furthermore, in a case where the information processing apparatus 60 is an apparatus integrated with the imaging device 40, the storage unit 62 of the information processing apparatus 60 can be regarded as the same block as the storage unit 42 of the imaging device 40. Furthermore, in a case where the information processing apparatus 60 is an apparatus integrated with the imaging device 40, the control unit 63 of the information processing apparatus 60 can be considered as the same block as the control unit 43 of the imaging device 40. Note that the information processing apparatus 60 may be configured to control the plurality of imaging devices 40. The information processing apparatus 60 may be configured to control one or a plurality of imaging devices 40 through cooperation of a plurality of information processing apparatuses 60.

Furthermore, the information processing apparatus 60 may be an apparatus integrated with the base station device 30 or an apparatus integrated with the management device 20. Naturally, the information processing apparatus 60 may be an independent apparatus different from these devices.

In a case where the information processing apparatus 60 is an apparatus integrated with the base station device 30, the communication unit 61 of the information processing apparatus 60 can be considered as the same block as the wireless communication unit 31 and/or the network communication unit 34 of the base station device 30. Furthermore, in a case where the information processing apparatus 60 is an apparatus integrated with the base station device 30, the storage unit 62 of the information processing apparatus 60 can be considered as the same block as the storage unit 32 of the base station device 30. Furthermore, in a case where the information processing apparatus 60 is an apparatus integrated with the base station device 30, the control unit 63 of the information processing apparatus 60 can be considered as the same block as the control unit 33 of the base station device 30.

Furthermore, in a case where the information processing apparatus 60 is an apparatus integrated with the management device 20, the communication unit 61 of the information processing apparatus 60 can be regarded as the same block as the communication unit 21 of the management device 20. Furthermore, in a case where the information processing apparatus 60 is an apparatus integrated with the management device 20, the storage unit 62 of the information processing apparatus 60 can be considered as the same block as the storage unit 22 of the management device 20. Furthermore, in a case where the information processing apparatus 60 is an apparatus integrated with the management device 20, the control unit 63 of the information processing apparatus 60 can be considered as the same block as the control unit 23 of the management device 20.

Hereinafter, each block included in the information processing apparatus 60 is described in detail.

The communication unit 61 is a communication interface for communicating with other devices. The communication unit 61 may also be a network interface or a device connection interface. For example, the communication unit 61 may be either a local area network (LAN) interface such as a network interface card (NIC), or a USB interface configured with a universal serial bus (USB) host controller, a USB port, and the like. Furthermore, the communication unit 61 may be either a wired interface or a wireless interface. The communication unit 61 functions as a communication means of the information processing apparatus 60. The communication unit 61 communicates with other devices under the control of the control unit 13.

The storage unit 62 is a storage device capable of reading and writing data, such as a DRAM, an SRAM, a flash memory, or a hard disk. The storage unit 62 functions as a storage means of the information processing apparatus 60.

The control unit 63 is a controller that controls each unit of the information processing apparatus 60. The control unit 63 is implemented by, for example, a processor such as a CPU or an MPU. For example, the control unit 63 is implemented by a processor executing various programs stored in a storage device inside the information processing apparatus 60 using a RAM or the like as a work area. Note that the control unit 63 may be implemented by an integrated circuit such as an ASIC or an FPGA. Any of the CPU, the MPU, the ASIC, and the FPGA may be regarded as a controller.

As illustrated in FIG. 8, the control unit 63 includes an acquisition unit 631, a determination unit 632, an association unit 633, an analysis unit 634, and a transmission control unit 635. Each block (the acquisition unit 631 to the transmission control unit 635) constituting the control unit 63 is a functional block representing a function of the control unit 63. These functional blocks may be either software blocks or hardware blocks. For example, each of the functional blocks described above may be one software module implemented by software (including microprograms), or may be one circuit block on a semiconductor chip (die). Naturally, each functional block may be one processor or one integrated circuit. A configuration method of the functional block is arbitrary.

Note that the control unit 63 may be configured by a functional unit different from the above-described functional blocks. In addition, some or all of the operations of each block (the acquisition unit 631 to the transmission control unit 635) constituting the control unit 63 may be performed by another device. For example, some or all of the operations of each block constituting the control unit 63 may be performed by the control unit 23 of the management device 20, the control unit 33 of the base station device 30, the control unit 43 of the imaging device 40, or the control unit 53 of the camera platform 50. As an example, the operations of the acquisition unit 631 to the transmission control unit 635 may be performed by the control unit 63 of the information processing apparatus 60, and the operation of the transmission control unit 635 may be performed by the control unit 43 of the imaging device 40 or the control unit 33 of the base station device 30. The operation of each block constituting the control unit 63 is described later.

3. OPERATION OF INFORMATION PROCESSING SYSTEM

The configuration of the information processing system 1 has been described above. Next, the operation of the information processing system 1 is described.

3-1. Overview of Process

The information processing system 1 is, for example, a system that delivers an image captured at an imaging venue such as a sports facility to a user. As described above, the information processing system 1 includes one or a plurality of imaging devices 40. The imaging device 40 is installed in an imaging venue (for example, a sports facility), captures an image at the imaging venue, and transmits the captured data (image information, imaging control information) to the server device 10 via the base station device 30. The server device 10 edits and transmits the captured data to the user.

In the present embodiment, the network connecting the base station device 30 and the server device 10 is divided into a plurality of slices. The plurality of slices has different quality in terms of latency. In the present embodiment, in order to enable the server device 10 to carry out high-quality imaging control, the imaging device 40, the base station device 30, or the management device 20 is enabled to selectively use slices used for transmission according to the type or the intended use of the transmission information transmitted from the imaging device 40 to the server device 10. For example, the imaging device 40, the base station device 30, or the management device 20 is enabled to selectively use the plurality of slices having different latency qualities, between transmission of data (for example, camera position and angle of view information; hereinafter referred to as imaging control information) used for processes related to imaging control, and transmission of other data (for example, image information).

In order for the imaging device 40, the base station device 30, or the management device 20 to selectively use the slice, the information processing apparatus 60 associates the information regarding the slice in which the transmission information is to be used for transmission with the transmission information on the basis of the type or the intended use of the transmission information. Note that, as described above, the information added to the transmission information may be referred to as slice-related information.

The slice-related information is, for example, slice identification information (hereinafter also referred to as a slice ID). The slice ID may be either network slice selection assistance information (NSSAI) or single-NSSAI (S-NSSAI). The NSSAI is a parameter introduced for network slice instance introduction, and is configured with one or a plurality of pieces of S-NSSAI. The S-NSSAI is configured with a slice/service type (SST) for specifying a network slice for a service or a function, and a slice differentiator (SD) for assisting selection of a network slice instance. Naturally, the slice ID is not limited to the NSSAI or the S-NSSAI. For example, if a network slice and a data network are associated, a data network name (DNN) may also be a slice ID.

Furthermore, the slice-related information may be information for specifying the core network (hereinafter also referred to as core network information). For example, in a case where a plurality of operators (for example, communication carriers) shares a common wireless access network, a public land mobile networks identifier (PLMN-ID) may also be the slice-related information. In addition, a decicated core network identifier (DCN-ID) may also be the slice-related information.

Furthermore, the slice-related information is not required to be information that can uniquely identify a slice or a core network. For example, information indicating a slice/service type (hereinafter also referred to as slice/service type information) may also be the slice-related information. Note that, if one slice (core network) is assigned to one slice/service type, the slice (core network) may be uniquely identified by the slice/service type. Furthermore, the slice-related information may be a name of a slice. Furthermore, the slice-related information may be meta-information including information that enables identification of a slice (for example, slice ID).

In addition, the slice-related information is not limited to particular information as long as a slice can be identified. For example, the slice-related information may be sensor information (for example, positional information and azimuth information such as GPS information), analysis information of the captured image (subject position, a uniform number, skeleton estimation, and the like), or imaging condition information (for example, a pan angle, a tilt angle, and zoom magnification). Furthermore, the slice-related information may be information for the information processing apparatus 60 to specify a transmission route of the transmission information. If a slice to be used for transmission is to be finally identified, the slice-related information may be information included in a header of a packet.

3-2. Relationship Between Type/Intended Use of Transmission Information and Slice Hereinafter, in order to facilitate understanding of the present embodiment, an example of a relationship between a type/intended use of the transmission information and a slice to be used for transmission is described. FIG. 9 is a diagram illustrating a relationship between a type/intended use of transmission information and a slice to be used for transmission.

In FIG. 9, the selectable slices are roughly classified into low latency slices and best-effort slices. The best-effort slice is, for example, a slice (first network slice) of which a slice/service type is the enhanced mobile broadband (eMBB) or the massive machine type communication (mMTC). Meanwhile, the low latency slice is, for example, a slice (second network slice) of which the slice/service type is the ultra-reliable low latency communications (URLLC). The low latency slice enables communication with lower latency than the best-effort slice.

There may be a plurality of low latency slices. In this case, a plurality of slices having different latency qualities may exist in the slices classified as the low latency slices. In the example of FIG. 9, there are three types low latency slices: low latency A; low latency B; and low latency C. Note that, in the example of FIG. 9, it is assumed that the low latency quality is in the order of low latency C, low latency B, and low latency A. In other words, a slice of low latency B enables communication with lower latency than a slice of low latency A, and a slice of low latency C enables communication with lower latency than the slice of low latency B. Note that low latency C is not necessarily always present. In this case, the transmission information classified as low latency C may be classified as low latency B.

Furthermore, a plurality best-effort slices may also exist. In the example of FIG. 9, there are two types of best-effort slices: best effort A and best effort B. In the example of FIG. 9, the transmission information classified as best effort A needs to be preferentially transmitted over the transmission information classified as best effort B. Therefore, in the example of FIG. 9, best effort A has a larger reserved bandwidth than best effort B.

FIG. 9 shows the types of transmission information associated with such slices. The transmission information is roughly classified into three types. In the example of FIG. 9, subject-related information, imaging information (imaging condition information), and image information are shown as the types of transmission information. The subject-related information and the imaging information are information different from the image information, and are information used for processing related to the imaging control.

The subject-related information is information regarding a subject included in the captured image captured by the imaging device 40. Examples of the subject-related information include (1) the uniform number/name information of the subject, (2) information regarding the depth to the subject (distance to the subject), (3) information regarding the color or luminance of the image of the subject, (4) luminance change (DVS) information of the image of the subject, (5) GPS information indicating the position of the subject, (6) estimation information of the posture or skeleton of the subject, and (7) information regarding acceleration applied to the subject.

The imaging information (imaging condition information) is information regarding an imaging condition of the captured image captured by the imaging device. Examples of the imaging information include (8) camera position information/angle of view information. The camera position information is positional information of the imaging device 40, and the angle of view information is information of an angle of view of a video captured by the imaging device 40.

The image information is information regarding an image captured by the imaging device 40. Examples of the image information include (9) information regarding an on-air video and a next video, and (10) information regarding other videos (video other than the on-air video and the next video).

In the example of FIG. 9, the transmission information classified into the types (1) to (8) is transmitted in the low latency slice (second network slice). More specifically, the transmission information classified into the types (1) to (5) is transmitted in the low latency slice of low latency A. Meanwhile, the transmission information classified into the types (6) and (7) is transmitted in the slice of low latency B.

Meanwhile, the transmission information classified into the type (8) is transmitted in the slice of low latency B or low latency C. The transmission information classified into the types (1) to (7) may be transmitted in the slice of low latency B or low latency C, and the transmission information classified into the type (8) may be transmitted in the slice of low latency C. As described above, the slice of low latency B enables communication with lower latency than the slice of low latency A, and the slice of low latency C enables communication with lower latency than the slice of low latency B.

Furthermore, the transmission information classified into the types (9) and (10) is transmitted in the best-effort slice (first network slice). More specifically, the transmission information classified into the type (9) is transmitted in the slice of best effort A. The transmission information classified into the type (10) is transmitted in the slice of best effort B. The slice of best effort A has a larger reserved bandwidth than the slice of best effort B.

Furthermore, FIG. 9 shows the intended use of the transmission information associated with the slices described above. The intended use of the transmission information is roughly classified into two types. In the example of FIG. 9, automatic control and video distribution/video production are shown as intended uses of the transmission information. The automatic control indicates that the transmission information is information used for automatic control (control by the server device 10) of the imaging device 40. Furthermore, the video distribution/video production indicates that the transmission information is information for video distribution/video production. Examples of the information for automatic control include subject current position identifying information, subject future position estimating information/scene estimating information, and camera imaging range identifying information. Furthermore, examples of the information for video distribution/video production include information for broadcasting/distribution and information for status confirmation/post-process.

The subject current position identifying information is for identifying the current position of the subject and is also the subject-related information. Specific examples of the information for identifying the current position of the subject include the transmission information classified into the types (1) to (5) described above. In the example of FIG. 9, the information for identifying the current position of the subject is transmitted in the low-latency slice of low latency A.

The subject future position estimating information is information for estimating the future position of the subject and is also the subject-related information. Meanwhile, the scene estimating information is information for estimating a scene, and can be considered as the subject-related information since the scene estimating information has a close relationship with the motion of the subject. Specific examples of the subject future position estimating information/scene estimating information include transmission information classified into the types (6) and (7) described above. In the example of FIG. 9, the subject future position information/scene estimating information is transmitted in the low-latency slice of low latency B.

The camera imaging range identifying information is information for identifying the imaging range of the imaging device 40, and is also imaging information (imaging condition information). A specific example of the camera imaging range identifying information is the transmission information classified into the type (8) described above. In the example of FIG. 9, the camera imaging range identifying information is transmitted in a slice of low latency B or low latency C.

The information for broadcasting/distribution is information used for broadcasting or distribution, and is also the image information. A specific example of the information for broadcasting/distribution is the transmission information classified into the type (9) described above. In the example of FIG. 9, the information for broadcasting/distribution is transmitted in a slice of best effort A.

The information for status confirmation/post-process is information used in status confirmation or post-process (for example, editing of replays and highlights), and is also the image information. A specific example of the information for status confirmation/post-process is transmission information classified into the type (10) described above. In the example of FIG. 9, information for status confirmation/post-process is transmitted in a slice of best effort B.

In the table shown in FIG. 9, acquisition methods and information regarding acquisition sources of the transmission information are also specified. For example, the transmission information classified into the type (1) described above is acquired by the analysis unit 634 carrying out an image analysis (for example, character recognition) on the image captured by the imaging device 40. Furthermore, the transmission information classified into the type (2) described above is acquired by the analysis unit 634 analyzing the image captured by the imaging device 40. The transmission information classified into the type (2) described above can also be acquired on the basis of an output from a sensor such as light detection and ranging (LiDAR). Furthermore, the transmission information classified into the types (3), (4), (9), and (10) described above is acquired on the basis of an output from an image sensor included in the imaging device 40. Furthermore, the transmission information classified into the types (5) and (7) described above is acquired on the basis of an output from a wearable sensor attached to the subject. Furthermore, the transmission information classified into the type (6) described above is acquired by the analysis unit 634 (for example, an AI function of the analysis unit 634) analyzing the image captured by the imaging device 40. Furthermore, the transmission information classified into the type (8) described above is acquired on the basis of outputs from various sensors (for example, GPS and azimuth sensor) included in the imaging device 40 and/or the camera platform 50. The transmission information classified into the type (8) described above can also be acquired on the basis of the metadata included in the transmission information.

3-3. Transmission Control Process

The relationship between the type/intended use of the transmission information and the slice has been described above, and the operation of the information processing system 1 is described in detail below.

FIG. 10 is a flowchart showing a transmission control process according to the present embodiment. The transmission control process is a process for controlling transmission of transmission information transmitted from the imaging device 40 to the server device 10. The transmission control process illustrated in FIG. 10 is executed by, for example, the control unit 63 of the information processing apparatus 60. The transmission control process is executed, for example, every time transmission information is generated in the imaging device 40. For example, the transmission control process is executed in a case where the transfer file is stored in the storage unit 42 of the imaging device 40. The transmission control processing is described below with reference to the flowchart of FIG. 10.

First, the acquisition unit 631 of the control unit 63 acquires the transmission information from the imaging device 40 (step S101). The transmission information may be a captured image (image information) captured by the imaging device 40 or imaging condition information (for example, pan angle information, tilt angle information, and zoom magnification information).

Furthermore, the transmission information may include sensor information (GPS information, azimuth information, and the like). For example, in a case where a sensor is attached to a subject (a player or artist, or a tool) or the like, information from the sensor may be associated with the captured image (image information), and the associated information may be used as the transmission information. In this case, the association may be based on time synchronization. The synchronization process may be performed by any of the sensor, the imaging device 40, and the information processing apparatus 60.

Furthermore, the transmission information may be analysis information (for example, subject position information, uniform number information, skeleton estimation information, and the like) of the captured image (image information) captured by the imaging device 40. The analysis of the captured image (image information) may be carried out by the analysis unit 634 of the information processing apparatus 60. For example, the analysis unit 634 acquires analysis information by carrying out known image analysis such as subject recognition, face recognition, person recognition, motion detection, uniform number/name recognition (character recognition), skeleton/posture estimation (OpenPose or the like), and the like on the captured image acquired by the acquisition unit 631. The analysis unit 634 does not need to carry out all of the analysis processing described herein. A part or all of the analysis processing may be executed by an image signal processor (ISP) of an image sensor (imaging unit 45) included in the imaging device 40.

Furthermore, the analysis unit 634 may carry out not only the image analysis but also analysis of the imaging condition. For example, the analysis unit 634 may analyze the imaging range of the captured image (image information) captured by the imaging device 40. In this case, the analysis unit 634 may specify the current imaging range using the pan/tilt angle or the zoom magnification with reference to the positional information of the imaging device 40 at the time of calibration. The acquisition unit 631 acquires an analysis result of the analysis unit 634 (or the imaging device 40) as the transmission information.

In addition, the acquisition unit 631 may acquire information classified into the types (1) to (10) presented in the section <3-2. Relationship between type/intended use of transmission information and slice> as the transmission information.

Next, the determination unit 632 of the control unit 63 determines the type or the intended use of the transmission information (step S102). At this time, as described in the section <3-2. Relationship between type/intended use of transmission information and slice>, the determination unit 632 may classify the type of the transmission information into three types: the subject-related information; the imaging information; and the image information, and determine which of these types is applicable to the transmission information to be determined. In addition, the determination unit 632 may classify the types of the transmission information more finely. For example, the determination unit 632 may classify the types of the transmission information into the types (1) to (10) presented in the section <3-2. Relationship between type/intended use of transmission information and slice> and determine which of these types is applicable to the transmission information.

Furthermore, as described in the section <3-2. Relationship between type/intended use of transmission information and slice>, the determination unit 632 may classify the intended use of the transmission information into two: automatic control and video distribution/video production, and distinguish which of these is applicable to the transmission information to be determined. In addition, the determination unit 632 may classify the intended use of the transmission information more finely. For example, as described in the section <3-2. Relationship between type/intended use of transmission information and slice>, the determination unit 632 may classify the automatic control into the subject current position, the subject future position/scene estimation, and the camera imaging range, and may classify the video distribution/video production into broadcasting/distribution and status confirmation/post-process, and determine which one of these is applicable to the transmission information to be determined.

Subsequently, the association unit 633 of the control unit 63 associates the slice-related information corresponding to the type or the intended use of the transmission information with the transmission information (step S103). The slice-related information is information regarding a network slice in which the transmission information is to be used for transmission. For example, when the transmission information is the subject-related information or the imaging information, the association unit 633 associates the information indicating the low latency slice with the transmission information. Furthermore, when the transmission information is image information, the association unit 633 associates information indicating the best-effort slice with the transmission information. Furthermore, if the transmission information is information for automatic control, the association unit 633 associates information indicating the low latency slice with the transmission information. Furthermore, if the transmission information is information for video distribution/video production, the association unit 633 associates information indicating the best slice with the transmission information. In addition, the association unit 633 selects slice-related information to be associated with the transmission information on the basis of the relationship described in the section <3-2. Relationship between type/intended use of transmission information and slice>.

Note that, as described above, the slice-related information may be the slice ID, the core network information, or the slice/service type information. Furthermore, the slice-related information may be a name of the slice or meta information. In addition, the slice-related information may be sensor information, analysis information of the captured image, or imaging condition information.

Next, the transmission control unit 635 of the control unit 63 transmits the transmission information together with the slice-related information (step S104). At this time, the transmission control unit 635 may directly or indirectly control the wireless communication unit 41 of the imaging device 40 to transmit the transmission information with which the slice-related information is associated. Note that the transmission information and the slice-related information are not necessarily transmitted at the same time. For example, the transmission control unit 635 may transmit the slice-related information to the base station device 30 or the management device 20, and then transmit the transmission information. In addition, the steps described above may be executed by different devices. For example, the information processing apparatus 60 may carry out the processing of step S101 to step S103, and the imaging device 40 may carry out step S104. The control unit 43 of the imaging device 40 may include the transmission control unit 635.

Note that the base station device 30 having acquired the transmission information from the imaging device 40 selects a slice to be used for transmission on the basis of the slice-related information. Note that the selection of the slice may be carried out by the management device 20. For example, when the core network is 5GC, the selection of the slice may be carried out by a network slice selection function (NSSF) of the management device 20.

Here, it is assumed that the slice identified by the slice-related information is a low-latency slice. In this case, the base station device 30 or the management device 20 sets a slice used for transmission as a low latency slice. Or, it is assumed that the slice identified by the slice-related information is a best-effort slice. In this case, the base station device 30 or the management device 20 sets a slice used for transmission as a best-effort slice. Note that the best-effort slice may also be a slice of which the slice/service type is the eMBB or the mMTC. In addition, the low latency slice may also be a slice of which the slice/service type is the URLLC. Naturally, the classification of slices is not limited thereto. Then, the base station device 30 transmits the transmission information to the server device 10 using the selected slice.

With this arrangement, a slice with low latency is used for transmission of information required for imaging control, while another slice with a milder latency quality is used for transmission of information that is not much required for imaging control, whereby high-quality imaging control (for example, imaging control with less missed scenes) is enabled without imposing a load on the communication resources.

Note that various methods can be adopted as a method for selecting a network slice (hereinafter referred to as a slice selection method).

For example, the slice selection method used in the present embodiment may be a multi-operator core network (MO-CN) method. In the case of the MO-CN, a PLMN-ID is assigned in advance to each of a plurality of core networks, and a PLMN-ID list thereof is configured in advance in the base station device 30. Then, the base station device 30 broadcasts the PLMN-ID list. The association unit 633 selects the PLMN-ID corresponding to the type or the intended use of the transmission information from among the PLMN-IDs included in the PLMN-ID list. The PLMN-ID selected at this time is the slice-related information. Then, the transmission control unit 635 transmits the transmission information together with the selected PLMN-ID to the base station device 30. The base station device 30 transmits the transmission information to the server device 10 using the slice identified by the PLMN-ID.

Furthermore, if one imaging device 40 is allowed to access a plurality of core networks, the slice selection method can be an enhanced dedicated core (eDECOR) method. In the case of the eDECOR, available DCN-IDs are assigned to the imaging device 40 in advance. The association unit 633 selects the DCN-ID corresponding to the type or the intended use of the transmission information from among the available DCN-IDs. The DCN-ID selected at this time is the slice-related information. Then, the transmission control unit 635 transmits the transmission information together with the selected DCN-ID to the base station device

30. The base station device 30 transmits the transmission information to the server device 10 using the slice identified by the DCN-ID.

Furthermore, the slice selection method may be a method in a 5G core network. In this case, the association unit 633 selects the slice ID corresponding to the type or the intended use of the transmission information. The slice ID is, for example, the NSSAI. The imaging device 40 transmits the slice ID to the management device 20 via the base station device 30. The management device 20 carries out various configurations so that the imaging device 40 can use one or a plurality of slices on the basis of the information received from the imaging device 40. The transmission control unit 635 transmits the transmission information by using a slice corresponding to the type or the intended use of the transmission information among one or a plurality of available slices. At this time, information (for example, routing information) for the base station device 30 to distribute the transmission information to each slice may be considered as the slice-related information.

Note that the slice selection method is not limited to the methods described above, and various other methods can be adopted. For example, the slice selection method may also be a dedicated core (DECOR) method, or may also be a method unique to an operator (communication operator) or a user.

3-4. Example of Control by Server Device

The transmission control process has been described above, and next, an example of control of the server device 10 having received the transmission of the transmission information is described.

As described above, the server device 10 is a device that controls the imaging device 40. For example, the server device 10 generates a signal (for example, the PTZ control signal) for controlling the imaging device 40 from a desired composition with respect to the imaging device 40 and the current imaging information by using the information acquired from the imaging device 40 and the sensor, and transmits the generated control signal to the imaging device 40. The imaging device 40 operates on the basis of the control signal. As examples of control by the server device 10, the following (1) to (4) are envisaged.

(1) Composition Control According to Role of Each Imaging Device

For example, it is assumed that there are three imaging devices 40 (imaging devices 40₁, 40₂, 40₃). Then, it is assumed that the composition conditions include the following conditions. Composition condition 1: The imaging device 40₁ captures a specific player, the imaging device 40₂ captures a ball, and the imaging device 40₃ captures a player congestion region, at respective centers of the angles of view. Composition condition 2: Each imaging device 40 images a specific player or a ball in a predetermined size. At this time, the server device 10 receives the information for automatic control (for example, subject current position information and subject future position information) and the information of the current imaging condition (for example, information regarding the imaging range of the captured image) acquired from each imaging device 40, and generates a control signal (for example, the PTZ control signal) for matching each composition.

(2) Composition Control According to Imaging Subject

The server device 10 generates a control signal for composition matching on the basis of the subject information acquired from a certain imaging device 40 and the area information thereof, so that another imaging device 40 images a different subject. Furthermore, the server device 10 may generate a control signal for composition matching on the basis of the subject information acquired from a certain imaging device 40 and the area information thereof, so that another imaging device 40 captures the same subject from a different viewpoint. For example, in a case where a certain imaging device 40 images a subject from the front, the server device 10 generates a control signal so that another imaging device 40 images the same subject from the side.

(3) Composition Control According to Scene

The server device 10 generates a control signal for composition matching on the basis of scene information (a shot or the like) acquired on the basis of a posture estimation result of a certain imaging device 40 or the like, so as to image a subject (goal) relevant to the scene.

(4) Parameter Control Other than Composition Control

On the basis of the luminance information and the like of a certain imaging device 40, the server device 10 controls camera parameters (IRIS and the like) of another imaging device 40 such that the another imaging device 40 also has the comparable luminance to the certain imaging device 40.

Here, instead of using the acquired information directly for composition control, the server device 10 may further analyze the information using information received from each imaging device 40, and carry out composition control using the analyzed information. For example, the skeleton estimation information is 2D information at the moment of acquisition from each imaging device 40. Therefore, the server device 10 converts the 2D skeleton estimation information acquired from each imaging device 40 into 3D skeleton estimation information, and carries out scene estimation and behavior estimation using the 3D skeleton estimation information. Then, the server device 10 uses the estimation result for composition control.

3-5. Another Example of Transmission Control Process

Figure 11:
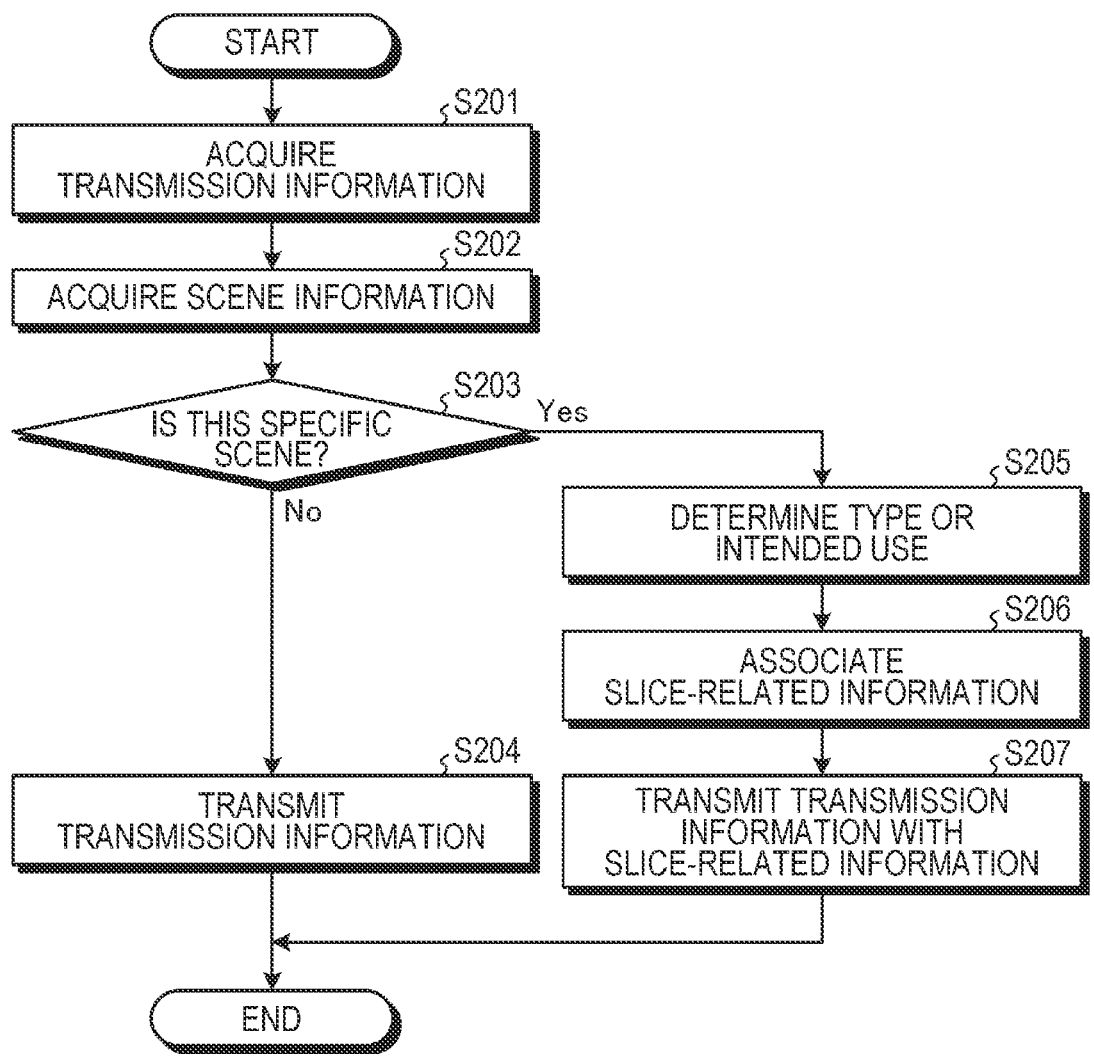
FIG. 11 is a flowchart showing another example of the transmission control process.

In the transmission control process illustrated in FIG. 10, the slice-related information is always associated with the transmission information; however, the slice-related information may be associated with the transmission information only in a case where a specific scene is detected. FIG. 11 is a flowchart showing another example of the transmission control process. Hereinafter, another example of the transmission control process is described with reference to the flowchart of FIG. 11.

First, the acquisition unit 631 of the control unit 63 acquires the transmission information from the imaging device 40 (step S201). For example, the acquisition unit 631 acquires a captured image and analysis information of the captured image.

Next, the acquisition unit 631 of the control unit 63 acquires scene information corresponding to the transmission information (step S202). The scene information may be identified by the analysis unit 634 of the control unit 63. Here, the acquisition unit 631 may acquire the scene information identified by analysis by the analysis unit 634. Furthermore, the acquisition unit 631 may acquire the scene information identified from an image captured by another imaging device 40, from another device (for example, the server device 10 or another imaging device 40). Specific examples of the scene information include a shot scene, a long pass scene, and the like.

Note that, since the shot scene is important, in a case where the scene information indicates the shot scene, the server device 10 needs to control each imaging device 40 to have lower latency so as not to miss the scene. Furthermore, since in the long pass scene the position of the ball greatly changes, in a case where the scene information indicates the long pass scene, the server device 10 needs to re-control the composition of each imaging device 40. On the other hand, in a scene where the defense and the offense are balanced, such as a scene with the short passes being repeatedly made, the imaging control of the server device 10 may be coarse control.

Therefore, the determination unit 632 of the control unit 63 determines whether or not the scene identified by the scene information is a preset specific scene (step S203). The specific scene is, for example, a shot scene or a long pass scene.

In a case where the scene identified by the scene information is not the specific scene (step S203: No), for example, in the case of the scene in which the defense and the offense are balanced, highly accurate imaging control is not required, and therefore the transmission control unit 635 of the control unit 63 transmits the transmission information without the slice-related information (step S204).

On the other hand, in a case where the scene identified by the scene information is the specific scene (step S203: Yes), the determination unit 632 determines the type or the intended use of the transmission information (step S205). Then, the association unit 633 of the control unit 63 associates the slice-related information corresponding to the type or the intended use of the transmission information with the transmission information, so that the transmission information can be transmitted under a desired transmission condition (for example, low latency or best effort) (step S206).

Subsequently, the transmission control unit 635 of the control unit 63 transmits the transmission information together with the slice-related information to the base station device 30 (step S207). The base station device 30 having acquired the transmission information from the imaging device 40 selects a slice to be used for transmission on the basis of the slice-related information. Then, the base station device 30 transmits the transmission information to the server device 10 using the selected slice.

With this arrangement, a slice to be used for transmission is designated only for a scene requiring highly accurate imaging control, whereby high-quality imaging control (for example, imaging control with less missed important scenes) is enabled without imposing a load on the communication resources.

4. MODIFICATION

The above-described embodiments are meant to show an example, and various modifications and applications are possible.

For example, in the above-described embodiments (the transmission control process illustrated in FIG. 10), the information processing apparatus 60 associates the slice-related information with the transmission information on the basis of the type or the intended use of the transmission information. The information processing apparatus 60 may associate the slice-related information only with specific transmission information instead of all the transmission information. For example, the information processing apparatus 60 assigns the slice-related information only to the transmission information using the low latency slice, and does not assign anything to other transmission information (transmission information to be transmitted in the best-effort slice).

In the above-described embodiments, the first network slice is a slice of which the slice/service type is the eMBB or the mMTC, and the second network slice is a slice of which the slice/service type is the URLLC. However, the first network slice and the second network slice are not limited thereto. If the second network slice has lower latency than the first network slice, the first network slice and the second network slice may be, for example, slices of classification unique to an operator or a user. In addition, the slice may be a network slice other than the first network slice and the second network slice, for example, a third network slice having different quality with respect to latency from the first network slice and the second network slice.

Furthermore, in the above-described embodiments, the imaging device 40 is installed on the camera platform 50. However, the imaging device 40 may also be installed in a mobile body. In this case, the "camera platform" mentioned in the above-described embodiments can be reworded as a "mobile body" as appropriate.

Note that the mobile body in which the imaging device 40 is installed may be similar to the mobile body exemplified in the section <2-3. Configuration of base station device>. In other words, the mobile body may be a mobile terminal, a mobile body that moves on the land, or a mobile body that moves in the ground. Alternatively, the mobile body may be either a mobile body that moves over water or a mobile body that moves under water. Yet alternatively, the mobile body may be either a mobile body that moves inside the atmosphere or a mobile body that moves outside the atmosphere.

Note that the mobile body may be a device separate from the imaging device 40 on which the imaging device 40 is mounted. In this case, one imaging device 40 may be mounted on the mobile body, or a plurality of imaging devices 40 may be mounted on the mobile body. Alternatively, the mobile body may be a device integrated with the imaging device 40. In other words, the imaging device 40 may be the mobile body itself. Note that the information processing apparatus 60 may be an apparatus integrated with the mobile body. Alternatively, the information processing apparatus 60 may be an apparatus integrated with the mobile body and the imaging device 40. Yet alternatively, the imaging device 40 and the information processing apparatus 60 may be an integrated apparatus, and the mobile body may be a separate device. Further alternatively, the mobile body and the information processing apparatus 60 may be an integrated apparatus, and the imaging device 40 may be a separate device. The mobile body and the imaging device 40 can be reworded as information processing apparatus as appropriate.

The control device that controls the server device 10, the management device 20, the base station device 30, the imaging device 40, the camera platform 50, the mobile body, or the information processing apparatus 60 of the present embodiment may be implemented by a dedicated computer system or a general-purpose computer system.

For example, a communication program for executing the above-described operation is stored and distributed in a computer-readable recording medium such as an optical disk, a semiconductor memory, a magnetic tape, or a flexible disk. Then, for example, the program is installed in a computer and the above-described processes are executed, whereby the control device is configured. At this time, the control device may be an external device (for example, a personal computer) of the server device 10, the management device 20, the base station device 30, the imaging device 40, the camera platform 50, the mobile body, or the information processing apparatus 60. Alternatively, the control device may be an internal device (for example, the control unit 13, the control unit 23, the control unit 33, the control unit 43, the control unit 53, or the control unit 63) of the server device 10, the management device 20, the base station device 30, the imaging device 40, the camera platform 50, the mobile body, or the information processing apparatus 60.

In addition, the communication program described above may be stored in a disk device included in the server device on a network such as the Internet, so that download or the like of the communication program to a computer is enabled. Alternatively, the above-described functions may be implemented through cooperation of an operating system (OS) and application software. In this case, a portion other than the OS may be stored and distributed in a medium, or the portion other than the OS may be stored in a server device, so that download or the like of the portion to a computer is enabled.

Furthermore, among the processes explained in the embodiments described above, all or a part of the processes described as being performed automatically can be performed manually, or all or a part of the processes described as being performed manually can be performed automatically by a known method. In addition, the processing procedures, the specific appellations, and the information including various data and parameters illustrated in the foregoing document and the drawings can be arbitrarily changed unless otherwise specified. For example, the various types of information illustrated in each figure are not limited to the illustrated information.

In addition, each constitutive element of each device illustrated in the drawings is of a conceptual nature in terms of the function, and is not necessarily physically configured as illustrated in the drawings. In other words, a specific form of distribution and integration of each device is not limited to the illustrated form, and all or a part thereof can be configured in a functionally or physically distributed or integrated manner in an arbitrary unit according to various loads, usage conditions, and the like.

In addition, the above-described embodiments can be combined as appropriate in an area where the processing details do not contradict each other. Furthermore, the order of each step shown in the flowcharts of the above-described embodiments can be changed as appropriate.

Furthermore, for example, the present embodiment can be implemented as any configuration making up an apparatus or a system, for example, a processor as a system large scale integration (LSI) or the like, a module employing a plurality of processors or the like, a unit employing a plurality of modules or the like, a set obtained by further adding other functions to a unit, or the like (that is, a configuration of a part of the apparatus).

Note that, in the present embodiment, the term "system" refers to a set of a plurality of constitutive elements (devices, modules (components), and the like), regardless of whether or not all the constitutive elements are in the same housing. Therefore, a plurality of devices housed in separate housings and connected via a network, and one device in which a plurality of modules is housed in one housing are both systems.

Furthermore, for example, the present embodiment can employ a configuration of cloud computing in which one function is shared and processed in cooperation by a plurality of devices via a network.

5. CONCLUSION

As described in the foregoing, according to an embodiment of the present disclosure, the information processing apparatus 60 associates information regarding a slice in which the transmission information is to be used for transmission with the transmission information, on the basis of the type or the intended use of the transmission information. Therefore, the base station device 30 and/or the imaging device 40 can transmit data to be transmitted with low latency to the server device 10 with low latency. As a result, the server device 10 can achieve high-quality imaging control.

The embodiments of the present disclosure have been described above; however, the technical scope of the present disclosure is not limited to the above-described embodiments as is, and various modifications can be made without departing from the gist of the present disclosure. In addition, constituent elements across different embodiments and modifications may be combined as appropriate.

Furthermore, the effects of the embodiments described in the present specification are merely examples and are not limiting in any way, and other effects may be produced.

Note that the present technology can also have the following configurations.

(1)
An information processing apparatus including:
a determination unit that determines a type or an intended use of transmission information transmitted from an imaging device to a predetermined device that performs processing related to imaging control of the imaging device; and
an association unit that associates, with the transmission information, information regarding a network slice in which the transmission information is to be used for transmission among a plurality of network slices on the basis of the determined type or the intended use.

(2)
The information processing apparatus according to the above (1),
in which the plurality of network slices includes at least one first network slice and at least one second network slice capable of carrying out communication with lower latency than the first network slice, and
in a case where the transmission information is information different from image information captured by the imaging device and is predetermined information used for processing related to the imaging control, the association unit associates the information regarding the second network slice with the transmission information.

(3)
The information processing apparatus according to above (2),
in which, in a case where the transmission information is the image information, the association unit associates information regarding the first network slice with the transmission information.

(4)
The information processing apparatus according to above (2) or (3),
in which the predetermined information includes at least subject-related information related to a subject included in a captured image captured by the imaging device.

(5)
The information processing apparatus according to above (4),
in which the subject-related information includes at least first subject-related information for identifying a current position of the subject and second subject-related information for estimating a future position of the subject.

(6)

The information processing apparatus according to above (5), in which the first subject-related information includes information regarding a uniform number or a name of the subject, the information being acquired by analyzing the captured image captured by the imaging device.

(7)

The information processing apparatus according to above (5) or (6), in which the first subject-related information includes information regarding a distance to the subject, the information being acquired by analyzing the captured image captured by the imaging device.

(8)

The information processing apparatus according to any one of above (5) to (7), in which the first subject-related information includes information regarding a color or luminance of the image of the subject captured by the imaging device.

(9)

The information processing apparatus according to any one of above (5) to (8), in which the first subject-related information includes information regarding luminance change of the image of the subject captured by the imaging device.

(10)

The information processing apparatus according to any one of above (5) to (9), in which the second subject-related information includes estimation information regarding a posture or a skeleton of the subject, the information being acquired by analyzing the captured image captured by the imaging device.

(11)

The information processing apparatus according to any one of above (2) to (10), in which the predetermined information includes at least information regarding an imaging condition of a captured image captured by the imaging device.

(12)

The information processing apparatus according to above (11), in which the information regarding the imaging condition includes at least positional information of the imaging device or angle-of-view information of a video captured by the imaging device.

(13)

The information processing apparatus according to any one of above (2) to (12), in which the predetermined information includes at least information regarding the subject included in the captured image captured by the imaging device and information regarding an imaging condition of the video captured by the imaging device, and the association unit associates information regarding a network slice capable of carrying out communication with lower latency than a network slice used for transmission of the information regarding the subject among the plurality of second network slices with the information regarding the imaging condition.

(14)

The information processing apparatus according to any one of above (2) to (13), in which the predetermined information includes at least information regarding the subject included in the captured image captured by the imaging device, the information regarding the subject includes at least first subject-related information for identifying a current position of the subject and second subject-related information for estimating a future position of the subject, and the association unit associates information regarding a network slice capable of carrying out communication with lower latency than a network slice used for transmission of the first subject-related information among the plurality of second network slices with the second subject-related information.

(15)

The information processing apparatus according to any one of above (2) to (14), in which the second network slice is a network slice of which a slice/service type is ultra-reliable low latency communications (URLLC).

(16)

The information processing apparatus according to any one of above (2) to (15), in which the first network slice is a network slice of which a slice/service type is enhanced mobile broadband (eMBB) or massive machine type communication (mMTC).

(17)

The information processing apparatus according to any one of above (1) to (16), further including a transmission control unit that transmits the transmission information with which the information regarding the network slice is associated, to a base station device capable of switching between network slices.

(18)

The information processing apparatus according to any one of above (1) to (17), in which the information regarding the network slice includes information indicating a slice/service type.

(19)

An information processing method including:

determining a type or an intended use of transmission information transmitted from an imaging device to a predetermined device that performs processing related to imaging control of the imaging device; and associating, with the transmission information, information regarding a network slice in which the transmission information is to be used for transmission among a plurality of network slices on the basis of the determined type or the intended use.

(20)

An information processing program that causes a computer to function as:

a determination unit that determines a type or an intended use of transmission information transmitted from an imaging device to a predetermined device that performs processing related to imaging control of the imaging device; and an association unit that associates, with the transmission information, information regarding a network slice in which the transmission information is to be used for transmission among a plurality of network slices on the basis of the determined type or the intended use.

REFERENCE SIGNS LIST

1 Information processing system
10 Server device

20 Management device
30 Base station device
40 Imaging device
50 Camera platform
60 Information processing apparatus
11, 21, 51, 61 Communication unit
31, 41 Wireless communication unit
12, 22, 32, 42, 52, 62 Storage unit
13, 23, 33, 43, 53, 63 Control unit
34, 44 Network communication unit
45 Imaging unit
54 Drive unit
311, 411 Reception processing unit
312, 412 Transmission processing unit
313, 413 Antenna
631 Acquisition unit
632 Determination unit
633 Association unit
634 Analysis unit
635 Transmission control unit

The invention claimed is:

1. An information processing apparatus, comprising:
a central processing unit (CPU) configured to:
   determines transmission information includes one of image information or first information different from the image information, wherein
   the transmission information is transmitted from an imaging device to a specific device, and
   the specific device controls an imaging operation of the imaging device;
   associate, based on the determination that the transmission information includes the image information, the transmission information with second information regarding a first network slice of a plurality of network slices,
   wherein the first network slice is for the transmission of the transmission information with a first latency; and
   associate, based on the determination that the transmission information includes the first information, the transmission information with third information regarding a second network slice of the plurality of network slices,
   wherein the second network slice is for the transmission of the transmission information with a second latency lower than the first latency.

2. The information processing apparatus according to claim 1, wherein the first information includes subject-related information related to a subject in a captured image captured by the imaging device.

3. The information processing apparatus according to claim 2, wherein the subject-related information includes;
   first subject-related information for identification of a current position of the subject, and
   second subject-related information for estimation of a future position of the subject.

4. The information processing apparatus according to claim 3, wherein
   the first subject-related information includes fourth information regarding at least one of a uniform number of the subject or a name of the subject, and
   the fourth information is based on the captured image.

5. The information processing apparatus according to claim 3, wherein
   the first subject-related information includes fourth information regarding a distance to the subject, and
   the fourth information is based on the captured image.

6. The information processing apparatus according to claim 3, wherein the first subject-related information includes fourth information regarding at least one of a color or a luminance of the captured image of the subject.

7. The information processing apparatus according to claim 3, wherein the first subject-related information includes fourth information regarding a luminance change of the captured image of the subject.

8. The information processing apparatus according to claim 3, wherein
   the second subject-related information includes estimation information regarding at least one of a posture of the subject or a skeleton of the subject, and
   the estimation information is based on the captured image.

9. The information processing apparatus according to claim 1, wherein the first information includes fourth information regarding an imaging condition of a captured image captured by the imaging device.

10. The information processing apparatus according to claim 9, wherein the fourth information includes at least one of positional information of the imaging device or angle-of-view information of the captured image.

11. The information processing apparatus according to claim 1, wherein
   the first information includes:
      fourth information regarding a subject in a captured image captured by the imaging device, and
      fifth information regarding an imaging condition of the captured image, and
   the CPU is further configured to:
      associate the fourth information with sixth information regarding a third network slice of the plurality of network slices,
         wherein the third network slice is for transmission of the fourth information with a third latency; and
      associate the fifth information with seventh information regarding a fourth network slice of the plurality of network slices,
         wherein the fourth network slice is for transmission of the fifth information with a fourth latency lower than the third latency.

12. The information processing apparatus according to claim 1, wherein
   the first information includes fourth information regarding a subject in a captured image captured by the imaging device,
   the fourth information includes:
      first subject-related information for identification of a current position of the subject, and
      second subject-related information for estimation of a future position of the subject, and
   the CPU is further configured to:
      associate the first subject-related information with fifth information regarding a third network slice of the plurality of network slices,
         wherein the third network slice is for transmission of the first subject-related information with a third latency; and
      associate the second subject-related information with sixth information regarding a fourth network slice of the Plurality of network slices,
         wherein the fourth network slice is for transmission of the second subject-related information with a fourth latency.

13. The information processing apparatus according to claim 1, wherein a slice/service type (SST) of the second network slice is ultra-reliable low latency communications (URLLC).

14. The information processing apparatus according to claim 1, wherein a slice/service type (SST) of the second network slice is one of enhanced mobile broadband (eMBB) or massive machine type communication (mMTC).

15. The information processing apparatus according to claim 1, wherein the CPU is further configured to transmit the transmission information and one of the second information or the third information, to a base station device that switches between the plurality of network slices.

16. The information processing apparatus according to claim 1, wherein the second information includes information indicating a slice/service type (SST).

17. An information processing method, comprising:
- determining transmission information includes one of image information or first information different from the image information, wherein
  - the transmission information is transmitted from an imaging device to a specific device, and
  - the specific device controls an imaging operation of the imaging device;
- associating, based on the determination that the transmission information includes the image information, the transmission information with second information regarding a first network slice of a plurality of network slices, wherein
  - wherein the first network slice is for the transmission of the transmission information with a first latency; and
- associating, based on the determination that the transmission information includes the first information, the transmission information with third information regarding a second network slice of the plurality of network slices,
  - wherein the second network slice is for the transmission of the transmission information with a second latency lower than the first latency.

* * * * *